(12) United States Patent
Toyoda et al.

(10) Patent No.: US 8,895,638 B2
(45) Date of Patent: Nov. 25, 2014

(54) ULTRAVIOLET RAY CURABLE INK JET COMPOSITION AND PRINTED OBJECT

(75) Inventors: Naoyuki Toyoda, Nagano (JP); Minoru Yamada, Nagano (JP); Masaya Shibatani, Nagano (JP); Toshiyuki Kobayashi, Nagano (JP); Hidekazu Moriyama, Nagano (JP); Taketoshi Kagose, Toyama (JP)

(73) Assignee: Seiko Epson Corporation (JP)

( * ) Notice: Subject to any disclaimer, the term of this patent is extended or adjusted under 35 U.S.C. 154(b) by 14 days.

(21) Appl. No.: 13/471,785

(22) Filed: May 15, 2012

(65) Prior Publication Data

US 2012/0295076 A1  Nov. 22, 2012

(30) Foreign Application Priority Data

May 16, 2011  (JP) ................. 2011-109907

(51) Int. Cl.
C09D 11/10 (2014.01)
C09D 11/101 (2014.01)
C09D 7/12 (2006.01)

(52) U.S. Cl.
CPC ............ C09D 7/1266 (2013.01); C09D 11/101 (2013.01); C09D 7/1275 (2013.01)
USPC ......... 523/160; 523/161; 428/195.1; 524/718

(58) Field of Classification Search
USPC ........................................................ 523/160
See application file for complete search history.

(56) References Cited

U.S. PATENT DOCUMENTS

| 2003/0199655 A1* | 10/2003 | Yurugi et al. ................. 526/320 |
| 2004/0214945 A1* | 10/2004 | Uozumi ........................ 524/551 |
| 2006/0000389 A1* | 1/2006 | Duguet et al. ................ 106/404 |
| 2008/0081124 A1 | 4/2008 | Sano et al. |
| 2009/0280302 A1 | 11/2009 | Fukumoto et al. |
| 2010/0330296 A1* | 12/2010 | Loccufier et al. ............. 427/511 |

FOREIGN PATENT DOCUMENTS

| JP | 2006-501345 | 1/2006 |
| JP | 2008-088228 | 4/2008 |
| JP | 2009-057548 | 3/2009 |
| WO | 2004-031304 | 4/2004 |

\* cited by examiner

*Primary Examiner* — Doris Lee
(74) *Attorney, Agent, or Firm* — Harness, Dickey & Pierce, P.L.C.

(57) ABSTRACT

An ultraviolet ray curable ink jet composition of the present invention is characterized by being adapted to be ejected using an ink jet method and containing:
  a polymerizable compound;
  metal particles subjected to a surface treatment; and
  a substance A having a partial structure represented by the following formula (1),

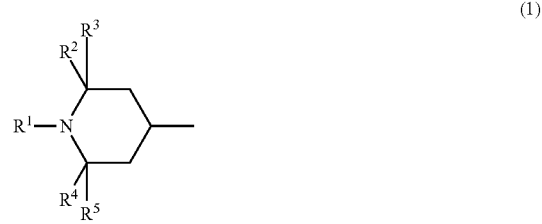

where $R^1$ is a hydrogen atom, an oxygen radical, a hydrocarbon group or an alkoxy group, and each of $R^2$, $R^3$, $R^4$ and $R^5$ is independently a hydrogen atom or a hydrocarbon group.

16 Claims, No Drawings

ULTRAVIOLET RAY CURABLE INK JET COMPOSITION AND PRINTED OBJECT

CROSS-REFERENCE TO RELATED APPLICATION

This application is based on and claims priority from Japanese Patent Application No. 2011-109907, filed on May 16, 2011, the content of which is incorporated herein by reference.

BACKGROUND

1. Technical Field

The present invention relates to an ultraviolet ray curable ink jet composition and a printed object.

2. Related Art

Conventionally, as a method of manufacturing a trinket showing an appearance having gloss, used is a metal plating, a metal foil press printing using a metal foil, a thermal transfer using a metal foil or the like.

However, there are problems in that a printed portion having a fine pattern is hardly to be formed by using such methods or such methods are difficult to be used with respect to a curved surface portion.

On the other hand, as a method of applying (printing) a composition containing a pigment or a dye onto an object, used is a method of applying the composition using an ink jet method. The ink jet method has such advantages as to be able to form the fine printed portion or to be used with respect to the curved surface portion.

Further, in order to further improve wear resistance, water resistance, solvent resistance and the like of a printed portion, recently, a composition (ultraviolet ray curable ink jet composition), which includes a polymerizable compound and can be cured due to ultraviolet ray irradiation, is used in the ink jet method (for example, Patent document 1).

However, in the case where metal particles are used instead of the pigment or the dye in the ultraviolet ray curable ink jet composition, stability (storage stability) of the composition is lowered. This causes a problem in that the composition is turned into a gel, and thus ejection stability and the like of the composition are lowered due to viscosity increase thereof.

Further, in order to suppress occurrence of such problems, it may be conceived that a polymerization inhibitor is added to the composition in a relatively high amount thereof (e.g., 2.0 mass % or more). However, in this case, the ultraviolet ray curable ink jet composition tends to have a lower curable property, and thus wear resistance of a printed portion of a printed object to be obtained using the ultraviolet ray curable ink jet composition becomes inferior. This causes lowering of durability of the printed object.

Furthermore, in the case where the ultraviolet ray curable ink jet composition contains the metal particles instead of the pigment or the dye, there is a problem in that the metal particles cannot sufficiently exhibit properties such as gloss which the metal itself constituting the metal particles inherently has.

Patent document 1: JP-A 2009-57548

SUMMARY

Accordingly, it is an object of the present invention to provide an ultraviolet ray curable ink jet composition which has excellent storage stability and a superior curing property and can be used for producing a printed object provided with a printed portion having high gloss and wear resistance, and having good durability.

This object is achieved by the present inventions described below.

An ultraviolet ray curable ink jet composition of the present invention is characterized by being adapted to be ejected using an ink jet method, comprising:

a polymerizable compound;

metal particles subjected to a surface treatment; and a substance A having a partial structure represented by the following formula (1),

where $R^1$ is a hydrogen atom, an oxygen radical, a hydrocarbon group or an alkoxy group, and each of $R^2$, $R^3$, $R^4$ and $R^5$ is independently a hydrogen atom or a hydrocarbon group.

This makes it possible to provide an ultraviolet ray curable ink jet composition which has excellent storage stability and a superior curing property and can be used for producing a printed object provided with a printed portion having high gloss and wear resistance, and having good durability.

In the ultraviolet ray curable ink jet composition of the present invention, it is preferred that the surface treatment for the metal particles is carried out using a material selected form the group consisting of a silane coupling agent, a phosphoric acid ester and a carboxylic acid.

By subjecting the metal particles to such a surface treatment, it is possible to further improve the storage stability of the ultraviolet ray curable ink jet composition and to make the gloss and the wear resistance of the printed portion to be formed using the ultraviolet ray curable ink jet composition more excellent.

In the ultraviolet ray curable ink jet composition of the present invention, it is preferred that the surface treatment for the metal particles is carried out using a compound having an alkyl group including carbon atoms of 8 to 20.

This makes it possible to further improve the storage stability and the ejection stability of the ultraviolet ray curable ink jet composition.

In the ultraviolet ray curable ink jet composition of the present invention, it is preferred that the surface treatment for the metal particles is carried out using a compound having no aromatic ring.

This makes it possible to especially improve the storage stability of the ultraviolet ray curable ink jet composition.

In the ultraviolet ray curable ink jet composition of the present invention, it is preferred that at least a surface of each metal particle is formed from Al.

Al inherently shows especially excellent gloss among various kinds of metal materials. However, in the case where particles formed from Al are used in the ultraviolet ray curable ink jet composition, the present inventors have found that the storage stability of the ultraviolet ray curable ink jet composition becomes lower to be turned into a gel, and therefore problems such as lowering of the ejection stability of the ultraviolet ray curable ink jet composition due to viscosity increase thereof occur more remarkably.

On the other hand, the present invention reliably prevents the occurrence of the above problems even in the case where the particles whose surfaces are formed from Al are used. Namely, by using metal particles obtained by subjecting the particles, in which at least surfaces thereof are mainly formed from Al, to a surface treatment, the effects of the present invention can be exhibited in an especially remarkable manner.

In the ultraviolet ray curable ink jet composition of the present invention, it is preferred that each metal particle is of a scaly shape.

This makes it possible to further improve the gloss, the water resistance and the like of the printed object to be produced using the ultraviolet ray curable ink jet composition.

In the ultraviolet ray curable ink jet composition of the present invention, it is preferred that an average particle size of the metal particles is in the range of 500 nm to 3.0 µm.

This makes it possible to further improve the gloss and the high-grade sense of the printed object to be produced using the ultraviolet ray curable ink jet composition. Further, this also makes it possible to make the storage stability and the ejection stability of the ultraviolet ray curable ink jet composition more excellent.

In the ultraviolet ray curable ink jet composition of the present invention, it is preferred that in the case where an amount of the substance A contained in the ultraviolet ray curable ink jet composition is defined as $X_A$ [mass %] and an amount of the metal particles contained therein is defined as $X_M$ [mass %], $X_A$ and $X_M$ satisfy a relationship of $0.01 \leq X_A/X_M \leq 0.8$.

By satisfying such a relationship, it is possible to further improve the storage stability and the ejection stability of the ultraviolet ray curable ink jet composition, and to make the gloss and the wear resistance of the printed portion to be formed using the ultraviolet ray curable ink jet composition especially excellent.

In the ultraviolet ray curable ink jet composition of the present invention, it is preferred that the ultraviolet ray curable ink jet composition further comprises a polymerization inhibitor, and an amount of the polymerization inhibitor contained in the ultraviolet ray curable ink jet composition is 0.6 mass % or less.

This makes it possible to adjust the amount of the polymerizable compound contained in the ultraviolet ray curable ink jet composition to a relatively high value. Therefore, it is possible to further improve the wear resistance and the like of the printed portion to be formed using the ultraviolet ray curable ink jet composition.

In the ultraviolet ray curable ink jet composition of the present invention, it is preferred that an amount of the polymerizable compound contained in the ultraviolet ray curable ink jet composition is 50 mass % or more.

This makes it possible to especially improve the wear resistance and the like of the printed portion to be formed using the ultraviolet ray curable ink jet composition.

In the ultraviolet ray curable ink jet composition of the present invention, it is preferred that the polymerizable compound contains at least one selected from the group consisting of phenoxy ethyl acrylate, 2-(2-vinyloxy ethoxy)ethyl acrylate and tetrahydro furfuryl acrylate.

In this case, it is possible to especially improve the storage stability and the ejection stability of the ultraviolet ray curable ink jet composition, and to make reactivity of the ultraviolet ray curable ink jet composition ejected by the ink jet method more excellent. This makes it possible to further improve the productivity of the printed object and the wear resistance and the like of the printed portion to be formed.

In the ultraviolet ray curable ink jet composition of the present invention, it is preferred that the polymerizable compound contains at least one selected from the group consisting of dipropylene glycol diacrylate, tripropylene glycol diacrylate, polypropylene glycol diacrylate, hexanediol diacrylate, cyclohexyl acrylate, γ-butyrolactone acrylate, N-vinyl caprolactam and 4-hydroxy butyl acrylate in addition to the acrylate.

In this case, it is possible to especially improve the storage stability and the ejection stability of the ultraviolet ray curable ink jet composition, and to make the reactivity of the ultraviolet ray curable ink jet composition ejected by the ink jet method more excellent. This makes it possible to further improve the productivity of the printed object and the wear resistance and the like of the printed portion to be formed.

In the ultraviolet ray curable ink jet composition of the present invention, it is preferred that the polymerizable compound contains dimethylol tricyclodecane diacrylate and/or amino acrylate.

This makes it possible to further improve the storage stability and the ejection stability of the ultraviolet ray curable ink jet composition and the wear resistance and the like of the printed portion to be formed.

A printed object of the present invention is characterized by being produced by applying the above ultraviolet ray curable ink jet composition onto an object, and then irradiating the ultraviolet ray curable ink jet composition with an ultraviolet ray.

This makes it possible to provide a printed object having a printed portion with high gloss and wear resistance, and having good durability.

DESCRIPTION OF EXEMPLARY EMBODIMENT

Hereinbelow, preferred embodiments of the present invention will be described in detail.

Ultraviolet Ray Curable Ink Jet Composition

First, an ultraviolet ray curable ink jet composition will be described.

The ultraviolet ray curable ink jet composition of the present invention is adapted to be ejected using an ink jet method and includes a polymerizable compound and metal particles.

Meanwhile, conventionally, as a method of manufacturing a trinket showing an appearance having gloss, used is a metal plating, a metal foil press printing using a metal foil, a thermal transfer using a metal foil or the like.

However, there are problems in that a printed portion having a fine pattern is hardly to be formed by using such methods or such methods are difficult to be used with respect to a curved surface portion. Further, there is also a problem in that the use of the metal foil press printing cannot form a metal-texture printing having a gradation.

On the other hand, as a method of applying (printing) a composition containing a pigment or a dye onto an object, used is a method of applying the composition using an ink jet method. The ink jet method has such advantages as to be able to form the fine printed portion or to be used with respect to the curved surface portion. Further, in order to further improve wear resistance, water resistance, solvent resistance and the like of a printed portion, recently, a composition (ultraviolet ray curable ink jet composition), which includes a polymerizable compound and can be cured due to ultraviolet ray irradiation, is used in the ink jet method.

However, in the case where metal particles are used instead of the pigment or the dye in the ultraviolet ray curable ink jet composition, stability (storage stability) of the composition is lowered. This causes a problem in that the composition is turned into a gel, and thus ejection stability and the like of the composition is lowered due to viscosity increase thereof.

Further, in order to suppress occurrence of such problems, it may be conceived that a polymerization inhibitor is added to the composition in a relatively high amount thereof (e.g., 2.0 mass % or more). However, in this case, the ultraviolet ray curable ink jet composition tends to have a lower curable property, and thus wear resistance of a printed portion of a printed object to be obtained using the ultraviolet ray curable ink jet composition becomes inferior. This causes lowering of durability of the printed object.

Furthermore, in the case where the ultraviolet ray curable ink jet composition contains the metal particles instead of the pigment or the dye, there is a problem in that the metal particles cannot sufficiently exhibit properties such as gloss which the metal itself constituting the metal particles inherently has.

Accordingly, the present inventors have earnestly conducted studies for purpose of solving the above problems. As a result, they have found the present invention. Namely, the ultraviolet ray curable ink jet composition of the present invention includes metal particles subjected to a surface treatment in addition to the polymerizable compound, and a substance A having a partial structure represented by the following formula (1).

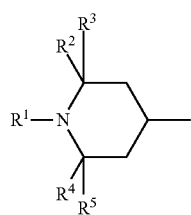

(1)

where $R^1$ is a hydrogen atom, an oxygen radical, a hydrocarbon group or an alkoxy group, and each of $R^2$, $R^3$, $R^4$ and $R^5$ is independently a hydrogen atom or a hydrocarbon group.

In this way, by containing the metal particles subjected to the surface treatment and the substance A in addition to the polymerizable compound, it is possible to make storage stability and a curing property of the ultraviolet ray curable ink jet composition excellent. Further, in a printed object to be produced using the ultraviolet ray curable ink jet composition, it is possible to effectively exhibit gloss and high-grade sense which a metal material itself constituting the metal particles inherently has, to thereby make gloss of a printed portion superior. Furthermore, it is also possible to make wear resistance of the printed portion superior, to thereby improve durability of the printed object.

Metal Particles

As described above, the ultraviolet ray curable ink jet composition of the present invention contains the metal particles subjected to the surface treatment.

Base Particles

First, base particles for constituting the metal particles (that is, particles to be subjected to the surface treatment) will be described.

Each of the base particles for constituting the metal particles has only to form at least a surface thereof from a metal material, but, for example, the entirety of each of the base particles may be formed from the metal material, or each of the base particles may include a base portion formed from a non-metal material and a coat covering the base portion and formed from the metal material.

Further, as the metal material for constituting the base particles, metal elements, various kinds of alloys or the like can be used. It is preferred that at least the surface of each base particle is formed from Al as a major component thereof. Al inherently shows especially excellent gloss among various kinds of metal materials. However, in the case where particles formed from Al are used in the ultraviolet ray curable ink jet composition, the present inventors have found that the storage stability of the ultraviolet ray curable ink jet composition becomes lower to be turned into a gel, and therefore problems such as lowering of the ejection stability of the ultraviolet ray curable ink jet composition due to viscosity increase thereof occur more remarkably.

On the other hand, the present invention reliably prevents the occurrence of the above problems even in the case where the particles whose surfaces are formed from Al are used. Namely, by using metal particles obtained by subjecting the particles, in which at least surfaces thereof are mainly formed from Al, to a surface treatment, the effects of the present invention can be exhibited in an especially remarkable manner.

Further, the base particles may be produced using any methods. In the case of the base particles formed from Al, it is preferred that they are produced by forming a film made of Al using a vapor phase film formation method, and then crushing the film. This makes it possible to more effectively express the gloss and the like which Al inherently has in a printed portion having a predetermined pattern to be formed using the ultraviolet ray curable ink jet composition of the present invention. Further, this also makes it possible to suppress variation of the particles in a property. Furthermore, by using such a method, it is possible to appropriately produce metal particles each having a relatively thin thickness.

In the case where the base particles are produced using such a method, for example, by forming (film-forming) the film made of Al onto a base material, it is possible to appropriately produce the base particles. As the base material, for example, a film made of a plastic material such as polyethylene terephthalate can be used. Further, the base material may have a release agent layer provided on a film-formation surface thereof.

Furthermore, it is preferred that the crushing is carried out by subjecting the film to ultrasonic vibration in a liquid. This makes it possible to easily and reliably obtain base particles having the above particle sizes and to suppress variation of the particles in a size, a shape and a property from occurring.

In the case where the crushing is carried out in the above method, as the above mentioned liquid, it is preferable to use: alcohols such as methanol, ethanol, propanol and butanol; hydrocarbon-based compounds such as n-heptane, n-octane, decane, dodecane, tetradecane, toluene, xylene, cymene, durene, indene, dipentene, tetrahydro naphthalene, decahydro naphthalene and cyclohexyl benzene; ether-based compounds such as ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, diethylene glycol monobutyl ether acetate, diethylene glycol n-butyl ether, tripropylene glycol dimethyl ether, triethylene glycol diethyl ether, 1,2-dimethoxy ethane, bis(2-methoxy ethyl)ether and p-dioxane; polar compounds such as propylene carbonate, γ-butyrolactone, N-methyl-2-pyrolidone, N,N-dimethyl formamide (DMF), N,N-dimethyl acetamide (DMA), dimethyl sulfoxide, cyclohexanone and acetonitrile; and the like.

By using such a liquid, it is possible to prevent undesirable oxidation and the like of the base particles and to further improve productivity of the base particles and the metal particles. Further, it is also possible to make variation of the particles in a size, a shape and a property smaller.

Surface Treatment

As described above, the metal particles contained in the ultraviolet ray curable ink jet composition according to the present invention are subjected to the surface treatment.

Examples of the kinds of the surface treatment include, but are not limited to, a treatment using a material selected form the group consisting of a silane coupling agent, a phosphoric acid ester and a carboxylic acid. By subjecting the metal particles to such a surface treatment, it is possible to further improve the storage stability of the ultraviolet ray curable ink jet composition and to make the gloss and the wear resistance of the printed portion to be formed using the ultraviolet ray curable ink jet composition more excellent.

It is preferred that the metal particles are subjected to a treatment using a compound having an alkyl group including carbon atoms of 8 to 20 as the surface treatment. By doing so, the base particles can be more sufficiently subjected to the surface treatment. This makes it possible to further improve the storage stability and the ejection stability of the ultraviolet ray curable ink jet composition.

Further, it is also preferred that the metal particles are subjected to a treatment using a compound having no aromatic ring as the surface treatment. This makes it possible to especially improve the storage stability of the ultraviolet ray curable ink jet composition.

Hereinbelow, description will be made on various kinds of materials capable of using for the surface treatment of the base particles in detail.

Silane Coupling Agent

As a silane coupling agent, for example, a silane compound having a silyl group and a hydrocarbon group can be used. Concrete examples of such a compound include dimethyl dimethoxy silane, diethyl diethoxy silane, 1-propenyl methyl dichloro silane, propyl dimethyl chloro silane, propyl methyl dichloro silane, propyl trichloro silane, propyl triethoxy silane, propyl trimethoxy silane, styryl ethyl trimethoxy silane, tetradecyl trichloro silane, 3-thiocyanate propyl triethoxy silane, p-tolyl dimethyl chloro silane, p-tolyl methyl dichloro silane, p-tolyl trichloro silane, p-tolyl trimethoxy silane, p-tolyl triethoxy silane, di-n-propyl di-n-propoxy silane, diisopropyl diisopropoxy silane, di-n-butyl di-n-butoxy silane, di-sec-butyl di-sec-butoxy silane, di-t-butyl di-t-butoxy silane, octadecyl trichloro silane, octadecyl methyl diethoxy silane, octadecyl triethoxy silane, octadecyl trimethoxy silane, octadecyl dimethyl chloro silane, octadecyl methyl dichloro silane, octadecyl methoxy dichloro silane, 7-octenyl dimethyl chloro silane, 7-octenyl trichloro silane, 7-octenyl trimethoxy silane, octyl methyl dichloro silane, octyl dimethyl chloro silane, octyl trichloro silane, 10-undecenyl dimethyl chloro silane, undecyl trichloro silane, vinyl dimethyl chloro silane, methyl octadecyl dimethoxy silane, methyl dodecyl diethoxy silane, methyl octadecyl dimethoxy silane, methyl octadecyl diethoxy silane, n-octyl methyl dimethoxy silane, n-octyl methyl diethoxy silane, triacontanyl dimethyl chloro silane, triacontanyl trichloro silane, methyl trimethoxy silane, methyl triethoxy silane, methyl tri-n-propoxy silane, methyl isopropoxy silane, methyl-n-butoxy silane, methyl tri-sec-butoxy silane, methyl tri-t-butoxy silane, ethyl trimethoxy silane, ethyl triethoxy silane, ethyl tri-n-propoxy silane, ethyl isopropoxy silane, ethyl-n-butoxy silane, ethyl tri-sec-butoxy silane, ethyl tri-t-butoxy silane, n-propyl trimethoxy silane, isobutyl trimethoxy silane, n-hexyl trimethoxy silane, hexadecyl trimethoxy silane, n-octyl trimethoxy silane, n-dodecyl trimethoxy silane, n-octadecyl trimethoxy silane, n-propyl triethoxy silane, isobutyl triethoxy silane, n-hexyl triethoxy silane, hexadecyl triethoxy silane, n-octyl triethoxy silane, n-dodecyl trimethoxy silane, n-octadecyl triethoxy silane, 2-[2-(trichloro silyl)ethyl]pyridine, 4-[2-(trichloro silyl)ethyl]pyridine, diphenyl dimethoxy silane, diphenyl diethoxy silane, 1,3-(trichloro silyl methyl) heptacosane, dibenzyl dimethoxy silane, dibenzyl diethoxy silane, phenyl trimethoxy silane, phenyl methyl dimethoxy silane, phenyl dimethyl methoxy silane, phenyl dimethoxy silane, phenyl diethoxy silane, phenyl methyl diethoxy silane, phenyl dimethyl ethoxy silane, benzyl triethoxy silane, benzyl trimethoxy silane, benzyl methyl dimethoxy silane, benzyl dimethyl methoxy silane, benzyl dimethoxy silane, benzyl diethoxy silane, benzyl methyl diethoxy silane, benzyl dimethyl ethoxy silane, benzyl triethoxy silane, dibenzyl dimethoxy silane, dibenzyl diethoxy silane, 3-acetoxy propyl trimethoxy silane, 3-acryloxy propyl trimethoxy silane, allyl trimethoxy silane, allyl triethoxy silane, 4-amino butyl triethoxy silane, (amino ethyl amino methyl)phenethyl trimethoxy silane, N-(2-amino ethyl)-3-amino propyl methyl dimethoxy silane, N-(2-amino ethyl)-3-amino propyl trimethoxy silane, 6-(amino hexyl amino propyl)trimethoxy silane, p-amino phenyl trimethoxy silane, p-amino phenyl ethoxy silane, m-amino phenyl trimethoxy silane, m-amino phenyl ethoxy silane, 3-amino propyl trimethoxy silane, 3-amino propyl triethoxy silane, ω-amino undecyl trimethoxy silane, amyl triethoxy silane, benzooxasilepin dimethyl ester, 5-(bicycloheptenyl)triethoxy silane, bis(2-hydroxy ethyl)-3-amino propyl triethoxy silane, 8-bromo octyl trimethoxy silane, bromo phenyl trimethoxy silane, 3-bromo propyl trimethoxy silane, n-butyl trimethoxy silane, 2-chloro methyl triethoxy silane, chloro methyl methyl diethoxy silane, chloro methyl methyl diisopropoxy silane, p-(chloro methyl)phenyl trimethoxy silane, chloro methyl triethoxy silane, chloro phenyl triethoxy silane, 3-chloro propyl methyl dimethoxy silane, 3-chloro propyl triethoxy silane, 3-chloro propyl trimethoxy silane, 2-(4-chloro sulfonyl phenyl)ethyl trimethoxy silane, 2-cyano ethyl triethoxy silane, 2-cyano ethyl trimethoxy silane, cyano methyl phenethyl triethoxy silane, 3-cyano propyl triethoxy silane, 2-(3-cyclohexenyl)ethyl trimethoxy silane, 2-(3-cyclohexenyl) ethyl triethoxy silane, 3-cyclohexenyl trichloro silane, 2-(3-cyclohexenyl)ethyl trichloro silane, 2-(3-cyclohexenyl)ethyl dimethyl chloro silane, 2-(3-cyclohexenyl) ethyl methyl dichloro silane, cyclohexyl dimethyl chloro silane, cyclohexyl ethyl dimethoxy silane, cyclohexyl methyl dichloro silane, cyclohexyl methyl dimethoxy silane, (cyclohexyl methyl)trichloro silane, cyclohexyl trichloro silane, cyclohexyl trimethoxy silane, cyclooctyl trichloro silane, (4-cyclooctenyl)trichloro silane, cyclopentyl trichloro silane, cyclopentyl trimethoxy silane, 1,1-diethoxy-1-silacyclopenta-3-en, 3-(2,4-dinitro phenyl amino) propyl triethoxy silane, (dimethyl chloro silyl)methyl-7,7-dimethyl norpinane, (cyclohexyl amino methyl)methyl diethoxy silane, (3-cyclopentadienyl propyl)triethoxy silane, N,N-diethyl-3-amino propyl)trimethoxy silane, 2-(3,4-epoxy cyclohexyl) ethyl trimethoxy silane, 2-(3,4-epoxy cyclohexyl)ethyl triethoxy silane, (furfuryl oxy methyl)triethoxy silane, 2-hydroxy-4-(3-triethoxy propoxy)diphenyl ketone, 3-(p-methoxy phenyl) propyl methyl dichloro silane, 3-(p-methoxy phenyl) propyl trichloro silane, p-(methyl phenethyl) methyl dichloro silane, p-(methyl phenethyl)trichloro silane, p-(methyl phenethyl)dimethyl chloro silane, 3-morpholino propyl trimethoxy silane, (3-glycidoxy propyl)methyl diethoxy silane, 3-glycidoxy propyl trimethoxy silane, 1,2,3,4,7,7-hexachloro-6-methyl diethoxy silyl-2-norbornene, 1,2,3,4,7,7-hexachloro-6-triethoxy silyl-2-norbornene, 3-iodo propyl trimethoxy silane, 3-isocyanate propyl triethoxy silane, (mercapto methyl)methyl diethoxy silane, 3-mercapto propyl methyl dimethoxy silane, 3-mercapto propyl dimethoxy silane, 3-mercapto propyl triethoxy silane, 3-methacryloxy propyl methyl diethoxy silane, 3-methacryloxy propyl trimethoxy silane, methyl {2-(3-trimethoxy silyl propyl amino) ethyl amino}-3-propionate, 7-octenyl trimethoxy silane, R—N-α-phenethyl-N'-triethoxy silyl propyl urea, S—N-α-phenethyl-N'-triethoxy silyl propyl urea, phenethyl trimethoxy silane, phenethyl methyl dimethoxy silane, phenethyl dimethyl methoxy silane, phenethyl dimethoxy silane, phenethyl diethoxy silane, phenethyl methyl diethoxy silane, phenethyl dimethyl ethoxy silane, phenethyl triethoxy silane, (3-phenyl propyl)dimethyl chloro silane, (3-phenyl propyl)methyl dichloro silane, N-phenyl amino propyl trimethoxy silane, N-(triethoxy silyl propyl) dansyl amide, N-(3-triethoxy silyl propyl)-4,5-dihydro imidazol, 2-(triethoxy silyl ethyl)-5-(chloro acetoxy) bicyclo heptane, (S)—N-triethoxy silyl propyl-O-menthocarbamate, 3-(triethoxy silyl propyl)-p-nitro benzamide, 3-(triethoxy silyl) propyl succinic anhydride, N-[5-(trimethoxy silyl)-2-aza-1-oxo-pentyl]caprolactam, 2-(trimethoxy silyl ethyl)pyridine, N-(trimethoxy silyl ethyl)benzyl-N,N,N-trimethyl ammonium chloride, phenyl vinyl diethoxy silane, 3-thiocyanate propyl triethoxy silane, N-{3-(triethoxy silyl) propyl}phthalamic acid, 1-trimethoxy silyl-2-(chloro methyl)phenyl ethane, 2-(trimethoxy silyl)ethyl phenyl sulfonyl azide, β-trimethoxy silyl ethyl-2-pyridine, trimethoxy silyl propyl diethylene triamine, N-(3-trimethoxy silyl propyl)pyrrole, N-trimethoxy silyl propyl-N,N,N-tributyl ammonium bromide, N-trimethoxy silyl propyl-N,N,N-tributyl ammonium chloride, N-trimethoxy silyl propyl-N,N,N-trimethyl ammonium chloride, vinyl methyl diethoxy silane, vinyl triethoxy silane, vinyl trimethoxy silane, vinyl methyl dimethoxy silane, vinyl dimethyl methoxy silane, vinyl dimethyl ethoxy silane, vinyl methyl dichloro silane, vinyl phenyl dichloro silane, vinyl phenyl diethoxy silane, vinyl phenyl dimethyl silane, vinyl phenyl methyl chloro silane, vinyl triphenoxy silane, vinyl tris-t-butoxy silane, adamanthyl ethyl trichloro silane, allyl phenyl trichloro silane, (amino ethyl amino methyl)phenethyl trimethoxy silane, 3-amino phenoxy dimethyl vinyl silane, phenyl trichloro silane, phenyl dimethyl chloro silane, phenyl methyl dichloro silane, benzyl trichloro silane, benzyl dimethyl chloro silane, benzyl methyl dichloro silane, phenethyl diisopropyl chloro silane, phenethyl trichloro silane, phenethyl dimethyl chloro silane, phenethyl methyl dichloro silane, 5-(bicyclo heptenyl) trichloro silane, 5-(bicycloheptenyl)triethoxy silane, 2-(bicycloheptyl)dimethyl chloro silane, 2-(bicycloheptyl) trichloro silane, 1,4-bis(trimethoxy silyl ethyl)benzene, bromo phenyl trichloro silane, 3-phenoxy propyl dimethyl chloro silane, 3-phenoxy propyl trichloro silane, t-butyl phenyl chloro silane, t-butyl phenyl methoxy silane, t-butyl phenyl dichloro silane, p-(t-butyl)phenethyl dimethyl chloro silane, p-(t-butyl) phenethyl trichloro silane, 1,3-(chloro dimethyl silyl methyl) heptacosane, ((chloro methyl)phenyl ethyl)dimethyl chloro silane, ((chloro methyl)phenyl ethyl)methyl dichloro silane, ((chloro methyl)phenyl ethyl)trichloro silane, ((chloro methyl)phenyl ethyl)trimethoxy silane, chloro phenyl trichloro silane, 2-cyano ethyl trichloro silane, 2-cyano ethyl methyl dichloro silane, 3-cyano propyl methyl diethoxy silane, 3-cyano propyl methyl dichloro silane, 3-cyano propyl methyl dichloro silane, 3-cyano propyl dimethyl ethoxy silane, 3-cyano propyl methyl dichloro silane, 3-cyano propyl trichloro silane, and the like.

Further, as the silane coupling agent, a silane compound having at least one fluorine atom in a molecule thereof (that is, a fluorine type silane compound) can be used. By using such a compound, it is possible to sufficiently improve chemical stability and dispersion stability of the metal particles in the ultraviolet ray curable ink jet composition, to thereby make the storage stability and the ejection stability for a long period of time of the ultraviolet ray curable ink jet composition sufficiently excellent. Further, it is also possible to appropriately align the metal particles in the vicinity of the printed portion (that is, leafing phenomenon of the metal particles can be generated) in the printed object produced using the ultraviolet ray curable ink jet composition. This makes it possible to more effectively exhibit the properties such as the gloss which the metal material constituting the metal particles inherently has.

Furthermore, by subjecting the metal particles to the surface treatment using the fluorine type silane compound, even in the case where a constituent material of the ultraviolet ray curable ink jet composition contains a polymerizable compound having low surface tension, it is possible to reliably align the metal particles in the vicinity of the printed portion in the printed object produced using the ultraviolet ray curable ink jet composition. This makes it possible to sufficiently exhibit the properties such as the gloss which the metal material constituting the metal particles inherently has.

For these reasons, it is possible to offer a broader choice of the polymerizable compound. This makes it possible to easily adjust the properties of the ultraviolet ray curable ink jet composition and the properties of the printed object produced using the ultraviolet ray curable ink jet composition (e.g., a viscosity of the ultraviolet ray curable ink jet composition, the storage stability thereof, the ejection stability thereof, the wear resistance of the printed object), without spoiling the gloss which the metal material inherently has.

As the fluorine type silane compound, a compound having a chemical structure represented by the following formula (2) is especially preferable.

$$R^1SiX^1_aR^2_{(3-a)} \qquad (2)$$

In the above formula (2), $R^1$ is a hydrocarbon group in which a part of hydrogen atoms or all hydrogen atoms are substituted from fluorine atom(s), $X^1$ is a hydrolysable group, an ether group, a chloro group or a hydroxyl group, $R^2$ is an alkyl group having carbon numbers of 1 to 4, and a is an integral number of 1 to 3.

This makes it possible to especially improve the storage stability of the ultraviolet ray curable ink jet composition, and to make the gloss and the wear resistance of the printed portion of the printed object produced using the ultraviolet ray curable ink jet composition especially excellent.

Examples of $R^1$ in the above formula (2) include an alkyl group, an alkenyl group, an aryl group, an aralkyl group and the like in which a part of hydrogen atoms or all hydrogen atoms are substituted from fluorine atom(s). Further, at least a part of hydrogen atoms contained in a molecular structure of each of such groups (that is, hydrogen atoms not substituted from fluorine atoms) may be substituted from an amino group, a carboxyl group, a hydroxyl group, a thiol group or the like. Furthermore, a carbon chain contained in each of the above groups may include a hetero atom such as —O—, —S—, —NH— or —N= or an aromatic ring such as benzene in a middle thereof.

Concrete examples of $R^1$ include a phenyl group, a benzyl group, a phenethyl group, a hydroxy phenyl group, a chloro phenyl group, an amino phenyl group, a naphthyl group, an anthranyl group, a pyrenyl group, a thienyl group, a pyrrolyl group, a cyclohexyl group, a cyclohexenyl group, a cyclopentyl group, a cyclopentenyl group, a pyridinyl group, a methyl group, an ethyl group, a n-propyl group, an isopropyl group, a n-butyl group, an isobutyl group, a sec-butyl group, a tert-butyl group, an octadecyl group, a n-octyl group, a chloro methyl group, a methoxy ethyl group, a hydroxy ethyl group, an amino ethyl group, a cyano group, a mercapto propyl group, a vinyl group, an allyl group, an acryloxy ethyl group, a methacryloxy ethyl group, a glycidoxy propyl group, an acetoxy group and the like, in which a part of hydrogen atoms or all hydrogen atoms are substituted from fluorine atom(s).

Concrete examples of the fluorine type silane compound represented by the above formula (2) include a compound having a structure in which a part of hydrogen atoms or all hydrogen atoms contained in the compound exemplified as the silane compound having a silyl group and a hydrocarbon group are substituted from fluorine atom(s).

Further, it is preferred that the fluorine type silane compound has a perfluoro alkyl structure ($C_nF_{2n+1}$). This makes it possible to further improve the storage stability of the ultraviolet ray curable ink jet composition, and to make the gloss and the wear resistance of the printed portion of the printed object produced using the ultraviolet ray curable ink jet composition more excellent.

Examples of the fluorine type silane compound having a perfluoro alkyl structure ($C_nF_{2n+1}$) include a compound represented by the following formula (3).

$$C_nF_{2n+1}(CH_2)_mSiX^1{}_aR^2{}_{(3-a)} \qquad (3)$$

In the above formula (3), $X^1$ is a hydrolysable group, an ether group a chloro group or a hydroxyl group, $R^2$ is an alkyl group having carbon numbers of 1 to 4, n is an integral number of 1 to 14, m is an integral number of 2 to 6, and a is an integral number of 1 to 3.

Concrete examples of the compound having such a structure include  $CF_3$—$CH_2CH_2$—$Si(OCH_3)_3$, $CF_3(CF_2)_3$—$CH_2CH_2$—$Si(OCH_3)_3$, $CF_3(CF_2)_5$—$CH_2CH_2$—$Si(OCH_3)_3$, $CF_3(CF_2)_5$—$CH_2CH_2$—$Si(OC_2H_5)_3$, $CF_3(CF_2)_7$—$CH_2CH_2$—$Si(OCH_3)_3$, $CF_3(CF_2)_{11}$—$CH_2CH_2$—$Si(OC_2H_5)_3$, $CF_3(CF_2)_3$—$CH_2CH_2$—$Si(CH_3)(OCH_3)_2$, $CF_3(CF_2)_7$—$CH_2CH_2$—$Si(CH_3)(OCH_3)_2$, $CF_3(CF_2)_8$—$CH_2CH_2$—$Si(CH_3)(OC_2H_5)_2$, $CF_3(CF_2)_8$—$CH_2CH_2$—$Si(C_2H_5)(OC_2H_5)_2$, and the like.

Further, as the fluorine type silane compound, a compound having a perfluoro alkyl ether structure ($C_nF_{2n+1}O$) instead of the above mentioned perfluoro alkyl structure ($C_nF_{2n+1}$) also can be used.

Examples of the fluorine type silane compound having a perfluoro alkyl ether structure ($C_nF_{2n+1}O$) include a compound represented by the following formula (4).

$$C_pF_{2p+1}O(C_pF_{2p}O)_r(CH_2)_mSiX^1{}_aR^2{}_{(3-a)} \qquad (4)$$

In the above formula (4), $X^1$ is a hydrolysable group, an ether group, a chloro group or a hydroxyl group, $R^2$ is an alkyl group having carbon numbers of 1 to 4, p is an integral number of 1 to 4, r is an integral number of 1 to 10, m is an integral number of 2 to 6, and a is an integral number of 1 to 3.

Concrete examples of the compound having such a structure include $CF_3O(CF_2O)_6$—$CH_2CH_2$—$Si(OC_2H_5)_3$, $CF_3O(C_3F_6O)_4$—$CH_2CH_2$—$Si(OCH_3)_3$, $CF_3O(C_3F_6O)_2(CF_2O)_3$—$CH_2CH_2$—$Si(OCH_3)_3$, $CF_3O(C_3F_6O)_8$—$CH_2CH_2$—$Si(OCH_3)_3$, $CF_3O(C_4F_9O)_5$—$CH_2CH_2$—$Si(OCH_3)_3$, $CF_3O$ 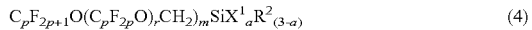 $(C_4F_9O)_5$—$CH_2CH_2$—$Si(CH_3)(OC_2H_5)_2$, $CF_3O(C_3F_6O)_4$—$CH_2CH_2$—$Si(C_2H_5)(OCH_3)_2$, and the like.

The base particles may be directly treated with the above fluorine type silane compound, but may be preferably treated with an acid or a base, and then treated with the above fluorine type silane compound. This makes it possible to reliably modify the surfaces of the base particles with the above fluorine type silane compound due to chemical bonding thereof, to thereby exhibit the above mentioned effects of the present invention in a more effective manner.

As the acid, a protonic acid such as hydrochloric acid, sulfuric acid, phosphoric acid, nitric acid, acetic acid, carbonic acid, formic acid, benzoic acid, chlorous acid, hypochlorous acid, sulfurous acid, hyposulfurous acid, nitrous acid, hyponitrous acid, phosphorous acid or hypophosphorous acid can be used. Among them, the hydrochloric acid, the phosphoric acid or the acetic acid is preferable. On the other hand, as the base, sodium hydroxide, potassium hydroxide, calcium hydroxide or the like can be used. Among them, the sodium hydroxide or the potassium hydroxide is preferable.

Phosphoric Acid Ester

As a phosphoric acid ester, for example, a compound having such a structure as to be obtained by dehydrating and condensing phosphoric acid and alcohol can be used. Examples of such a compound include a compound having a structure in which all or a part of tree hydrogen atoms contained in the phosphoric acid are substituted from organic group(s) due to dehydration and condensation thereof such as phosphoric acid monoester in which one hydrogen atom is substituted from the organic group, phosphoric acid diester in which two hydrogen atoms are substituted from the organic groups or phosphoric acid triester in which three hydrogen atoms are substituted from the organic groups.

As the phosphoric acid ester, a phosphoric acid ester having at least one fluorine atom in a molecule thereof (that is, a fluorine type phosphoric acid ester) can be used. By using such a compound, it is possible to sufficiently improve chemical stability and dispersion stability of the metal particles in the ultraviolet ray curable ink jet composition, to thereby make the storage stability and the ejection stability for a long period of time of the ultraviolet ray curable ink jet composition sufficiently excellent. Further, it is also possible to appropriately align the metal particles in the vicinity of the printed portion in the printed object produced using the ultraviolet ray curable ink jet composition. This makes it possible to more effectively exhibit the properties such as the gloss which the metal material constituting the metal particles inherently has.

Furthermore, by subjecting the metal particles to the surface treatment using the fluorine type phosphoric acid ester, even in the case where a constituent material of the ultraviolet ray curable ink jet composition contains a polymerizable compound having low surface tension, it is possible to reliably align the metal particles in the vicinity of the printed portion in the printed object produced using the ultraviolet ray curable ink jet composition. This makes it possible to sufficiently exhibit the properties such as the gloss which the metal material constituting the metal particles inherently has.

For these reasons, it is possible to offer a broader choice of the polymerizable compound. This makes it possible to easily adjust the properties of the ultraviolet ray curable ink jet composition and the properties of the printed object produced using the ultraviolet ray curable ink jet composition (e.g., a viscosity of the ultraviolet ray curable ink jet composition, the storage stability thereof, the ejection stability thereof, the wear resistance of the printed object), without spoiling the gloss which the metal material inherently has.

As the fluorine type phosphoric acid ester, a compound having a chemical structure represented by the following formula (5) is especially preferable.

$$PO R_n(OH)_{3-n} \quad (5)$$

In the above formula (5), R is $CF_3(CF_2)_m$—, $CF_3(CF_2)_m(CH_2)_l$—, $CF_3(CF_2)_m(CH_2O)_l$—, $CF_3(CF_2)_m(CH_2CH_2O)_l$—, $CF_3(CF_2)_mO$— or $CF_3(CF_2)_m(CH_2)_lO$—, n is an integral number of 1 to 3, m is an integral number of 2 to 18, and l is an integral number of 1 to 18.

This makes it possible to especially improve the storage stability of the ultraviolet ray curable ink jet composition, and to make the gloss and the wear resistance of the printed portion of the printed object produced using the ultraviolet ray curable ink jet composition especially excellent.

In the above formula (5), m is preferably an integral number of 3 to 14, and more preferably an integral number of 4 to 12. This makes it possible to more remarkably exhibit the above mentioned effects.

Further, in the above formula (5), l is preferably an integral number of 1 to 14, and more preferably an integral number of 1 to 10. This makes it possible to more remarkably exhibit the above mentioned effects.

Further, it is preferred that the fluorine type phosphoric acid ester has a perfluoro alkyl structure ($C_nF_{2n+1}$). This makes it possible to further improve the storage stability of the ultraviolet ray curable ink jet composition, and to make the gloss and the wear resistance of the printed portion of the printed object produced using the ultraviolet ray curable ink jet composition more excellent.

The base particles may be directly treated with the above fluorine type phosphoric acid ester, but may be preferably treated with an acid or a base, and then treated with the above fluorine type phosphoric acid ester. This makes it possible to reliably modify the surfaces of the base particles with the above fluorine type phosphoric acid ester due to chemical bonding thereof, to thereby exhibit the above mentioned effects of the present invention in a more effective manner.

As the acid, a protonic acid such as hydrochloric acid, sulfuric acid, phosphoric acid, nitric acid, acetic acid, carbonic acid, formic acid, benzoic acid, chlorous acid, hypochlorous acid, sulfurous acid, hyposulfurous acid, nitrous acid, hyponitrous acid, phosphorous acid or hypophosphorous acid can be used. Among them, the hydrochloric acid, the phosphoric acid or the acetic acid is preferable. On the other hand, as the base, sodium hydroxide, potassium hydroxide, calcium hydroxide or the like can be used. Among them, the sodium hydroxide or the potassium hydroxide is preferable.

Further, as the phosphoric acid ester, a long chain alkyl type phosphoric acid ester containing at least one alkyl group having carbon numbers of 6 or more in a molecule thereof can be used. By using such a compound, it is possible to further improve the chemical stability and the dispersion stability of the metal particles in the ultraviolet ray curable ink jet composition, to thereby make the storage stability and the ejection stability for a long period of time of the ultraviolet ray curable ink jet composition especially excellent.

As the long chain alkyl type phosphoric acid ester, a compound having a chemical structure represented by the following formula (6) is especially preferable.

$$PO R_n(OH)_{3-n} \quad (6)$$

In the above formula (6), R is $CH_3(CH_2)_m$—, $CH_3(CH_2)_m(CH_2O)_l$— or $CH_3(CH_2)_mO$—, n is an integral number of 1 to 3, m is an integral number of 5 to 19, and l is an integral number of 2 to 20.

This makes it possible to especially improve the storage stability of the ultraviolet ray curable ink jet composition, and to make the gloss and the wear resistance of the printed portion of the printed object produced using the ultraviolet ray curable ink jet composition especially excellent.

In the above formula (6), m is preferably an integral number of 5 to 19, and more preferably an integral number of 7 to 17. This makes it possible to more remarkably exhibit the above mentioned effects.

Further, in the above formula (6), l is preferably an integral number of 2 to 20, and more preferably an integral number of 4 to 16. This makes it possible to more remarkably exhibit the above mentioned effects.

The base particles may be directly treated with the above long chain alkyl type phosphoric acid ester, but may be preferably treated with an acid or a base, and then treated with the above long chain alkyl type phosphoric acid ester. This makes it possible to reliably modify the surfaces of the base particles with the above long chain alkyl type phosphoric acid ester due to chemical bonding thereof, to thereby exhibit the above mentioned effects of the present invention in a more effective manner.

As the acid, a protonic acid such as hydrochloric acid, sulfuric acid, phosphoric acid, nitric acid, acetic acid, carbonic acid, formic acid, benzoic acid, chlorous acid, hypochlorous acid, sulfurous acid, hyposulfurous acid, nitrous acid, hyponitrous acid, phosphorous acid or hypophosphorous acid can be used. Among them, the hydrochloric acid, the phosphoric acid or the acetic acid is preferable. On the other hand, as the base, sodium hydroxide, potassium hydroxide, calcium hydroxide or the like can be used. Among them, the sodium hydroxide or the potassium hydroxide is preferable.

Carboxylic Acid

As a carboxylic acid, for example, a compound having a hydrocarbon group and a carboxyl group (that is, fatty acid) can be used. Examples of such a compound include butanoic acid, pentanoic acid, hexanoic acid, heptanoic acid, octanoic acid, nonanoic acid, decanoic acid, dodecanoic acid, tetradecanoic acid, pentadecanoic acid, hexadecanoic acid, 9-hexadecenoic acid, heptadecanoic acid, octadecanoic acid, cis-9-octadecenoic acid, 11-octadecenoic acid, cis,cis-9,12-octadecadienoic acid, 9,12,15-octadecanetrienoic acid, 6,9,12-octadecatrienoic acid, nonadecanoic acid, eicosanoic acid, 8,11-eicosadienoic acid, 5,8,11-eicosatrienoic acid, 5,8,11-eicosatetraenoic acid, docosanoic acid, tetracosanoic acid, cis-15-tetracosanoic acid, hexacosanoic acid, octacosanoic acid, and triacontanoic acid.

Further, as the carboxylic acid, a fatty acid having at least one fluorine atom in a molecule thereof (that is, a fluorine substituted fatty acid) can be used. By using such a compound, it is possible to sufficiently improve chemical stability and dispersion stability of the metal particles in the ultraviolet ray curable ink jet composition, to thereby make the storage stability and the ejection stability for a long period of time of the ultraviolet ray curable ink jet composition sufficiently excellent. Further, it is also possible to appropriately align the metal particles in the vicinity of the printed portion in the printed object produced using the ultraviolet ray curable ink jet composition. This makes it possible to more effectively exhibit the properties such as the gloss which the metal material constituting the metal particles inherently has.

Furthermore; by subjecting the metal particles to the surface treatment using the fluorine substituted fatty acid, even in the case where a constituent material of the ultraviolet ray curable ink jet composition contains a polymerizable compound having low surface tension, it is possible to reliably align the metal particles in the vicinity of the printed portion in the printed object produced using the ultraviolet ray curable ink jet composition (that is, leafing phenomenon of the metal particles can be generated). This makes it possible to sufficiently exhibit the properties such as the gloss which the metal material constituting the metal particles inherently has.

For these reasons, it is possible to offer a broader choice of the polymerizable compound. This makes it possible to easily adjust the properties of the ultraviolet ray curable ink jet composition and the properties of the printed object produced using the ultraviolet ray curable ink jet composition (e.g., a viscosity of the ultraviolet ray curable ink jet composition, the storage stability thereof, the ejection stability thereof, the wear resistance of the printed object), without spoiling the gloss which the metal material inherently has.

Each metal particle may be of any shape such as a spherical shape, a fusiform shape or a needle shape, but is preferably of a scaly shape. This makes it possible to align the metal particles on an object, on which the ultraviolet ray curable ink jet composition is to be applied, so that major surfaces of the metal particles are oriented along a surface shape of the object.

Therefore, it is also possible to more effectively exhibit the gloss and the like, which the metal material constituting the metal particles inherently has, in the printed object to be produced, to thereby make the gloss and the high-grade sense of the printed portion having to be formed especially excellent. Further, in the case where the major surfaces of the metal particles are oriented along the surface shape of the object, it is also possible to further improve the water resistance of the printed portion.

Furthermore, in the case where metal particles not subjected to the above mentioned surface treatment is used or the ultraviolet ray curable ink jet composition contains no substance A described below is used, if each of the metal particles is of the scaly shape, the storage stability and the ejection stability of the ultraviolet ray curable ink jet composition are apt to be further remarkably lowered.

On the other hand, in the present invention, even if each of the metal particles is of the scaly shape, it is possible to prevent such a problem from occurring. Namely, in the case where each of the metal particles is of the scaly shape, the effects of the present invention can be more remarkably exhibited.

In the present invention, the scaly shape means a shape in which an area of the metal particle observed from a predetermined direction (that is, an area of each metal particle at a planar view thereof) is larger than an area of the metal particle observed from a direction orthogonal to the above observation direction, such as a plate shape or a curved plate shape.

In the case where an area of the metal particle observed from a direction, where a project area thereof peaks, (that is, an area of each metal particle at a planar view thereof) is defined as $S_1$ ($\mu m^2$) and an area of the metal particle observed from a direction that is orthogonal to the above observation direction, where an area thereof peaks, is defined as $S_0$ ($\mu m^2$), especially, a ratio of $S_1$ to $S_0$ ($S_1/S_0$) is preferably 2 or more, more preferably 5 or more, and even more preferably 8 or more.

For example, as this value, an average value obtained by observing arbitrary 10 metal particles, and averaging calculated values can be used.

An average particle size of the metal particles is preferably in the range of 400 nm to 3.0 µm, and more preferably in the range of 800 nm to 1.8 µm. This makes it possible to further improve the gloss and the high-grade sense of the printed object to be produced using the ultraviolet ray curable ink jet composition. Further, this also makes it possible to make the storage stability and the ejection stability of the ultraviolet ray curable ink jet composition more excellent.

Polymerizable Compound

A polymerizable compound is a component capable of being cured due to polymerization thereof by being irradiated with an ultraviolet ray. By containing such a component, it is possible to improve the wear resistance, the water resistance, the solvent resistance and the like of the printed object to be produced using the ultraviolet ray curable ink jet composition.

The polymerizable compound is of a liquid state, and preferably functions as a dispersion medium capable of dispersing the metal particles in the ultraviolet ray curable ink jet composition. In this case, since another dispersion medium, which is removed (vapored) in the course of producing the printed object, not have to be used, and therefore a step of removing the dispersion medium not have to be provided in the course of producing the printed object, it becomes possible to especially improve productivity of the printed object. Further, since a dispersion medium generally utilized as an organic solvent not have to be used, it is possible to prevent a problem resulted from a volatile organic compound (VOC) from being generated.

Furthermore, by containing the polymerizable compound, it is also possible to improve adhesion of the printed portion to be formed using the ultraviolet ray curable ink jet composition with respect to various kinds of objects. Namely, by containing the polymerizable compound, the ultraviolet ray curable ink jet composition can exhibit excellent media responsibility.

The polymerizable compound has only to be a component capable of being polymerized by ultraviolet ray irradiation. As such a polymerizable compound, various kinds of monomers and various kinds of oligomers (including a dimmer, a trimmer and the like) can be used. It is preferred that the ultraviolet ray curable ink jet composition contains at least a monomer component as the polymerizable compound. Since the monomer is a component having generally a viscosity lower than that of the olygomer component or the like, the use of the monomer is advantageous in that the ejection stability of the ultraviolet ray curable ink jet composition can make especially excellent.

Examples of the monomer of the polymerizable compound include isobornyl acrylate, 4-hydroxy butyl acrylate, lauryl acrylate, 2-methoxy ethyl acrylate, phenoxy ethyl acrylate, isooctyl acrylate, stearyl acrylate, cyclohexyl acrylate, 2-ethoxy ethyl acrylate, benzyl acrylate, 1H,1H,5H-octafluoro pentyl acrylate, 1H,1H,5H-octafluoro pentyl methacrylate, 2-hydroxy ethyl acrylate, 2-hydroxy propyl acrylate, isobutyl acrylate, t-butyl acrylate, tetrahydro furfuryl acrylate, ethyl carbitol acrylate, 2,2,2-trifluoro ethyl acrylate, 2,2,2-trifluoro ethyl methacrylate, 2,2,3,3-tetrafluoro propyl acrylate, methoxy triethylene glycol acrylate, PO-modified nonyl phenol acrylate, EO-modified nonyl phenol acrylate, EO-modified 2-ethyl hexyl acrylate, phenyl glycidyl ether acrylate, phenoxy diethylene glycol acrylate, EO-modified phenol acrylate, phenoxy ethyl acrylate, EO-modified cresol acrylate, methoxy polyethylene glycol acrylate, dipropylene glycol acrylate, dicyclopentenyl acrylate, dicyclopentenyl oxy ethyl acrylate, 2-n-butyl-2-ethyl-1,3-propanediol diacrylate, tripropylene glycol diacrylate, tetraethylene glycol diacrylate, 1,9-nonanediol diacrylate, 1,4-butanediol diacrylate, bisphenol A EO-modified diacrylate, 1,6-hexanediol diacrylate, polyethylene glycol 200 diacrylate, polyethylene glycol 300 diacrylate, neopentyl glycol hydroxyl pivalate diacrylate, 2-ethyl-2-butyl-propanediol diacrylate, polyethylene glycol 400 diacrylate, polyethylene glycol 600 diacrylate, polypropylene glycol diacrylate, 1,9-nonanediol diacrylate, 1,6-hexanediol diacrylate, bisphenol A EO-modified diacrylate, PO-modified bisphenol A diacrylate, EO-modified hydrogenated bisphenol A diacrylate, dipropylene glycol diacrylate, polypropylene glycol diacrylate, trimethylol propane triacrylate, pentaerythritol triacrylate, trimethylol propane EO-modified triacrylate, glycerine PO-added triacrylate, trisacryloyl oxy ethyl phosphate, pentaerythritol tetraacrylate, PO-modified trimethylol propane triacrylate, tris(acryloxy ethyl) isocyanurate, pentaerythritol triacrylate, trimethylol propane triacrylate, pentaerythritol triacrylate, 2-(2-vinyloxy ethoxy)ethyl acrylate, and the like.

Among them, the 4-hydroxy butyl acrylate, the phenoxy ethyl acrylate, the dicyclopentenyl acrylate, the dicyclopentenyl oxy ethyl acrylate, the tripropylene glycol diacrylate, the tetraethylene glycol diacrylate, the dipropylene glycol diacrylate, the trimethylol propane triacrylate, the trimethylol propane EO-modified triacrylate, the pentaerythritol tetraacrylate, the pentaerythritol triacrylate or the 2-(2-vinyloxy ethoxy)ethyl acrylate is preferable.

It is especially preferred that the ultraviolet ray curable ink jet composition contains at least one selected from the group consisting of the phenoxy ethyl acrylate, the 2-(2-vinyloxy ethoxy)ethyl acrylate and the tetrahydro furfuryl acrylate as the polymerizable compound. In this case, it is possible to improve the storage stability and the ejection stability of the ultraviolet ray curable ink jet composition, and to make reactivity (curing property) of the ultraviolet ray curable ink jet composition ejected by the ink jet method especially excellent. This makes it possible to further improve productivity of the printed object and the wear resistance and the like of the printed portion to be formed.

Further, it is preferred that the ultraviolet ray curable ink jet composition contains at least one selected from the group consisting of the dipropylene glycol diacrylate, the tripropylene glycol diacrylate, the polypropylene glycol diacrylate, the hexanediol diacrylate, the cyclohexyl acrylate, γ-butyrolactone acrylate, N-vinyl caprolactam and the 4-hydroxy butyl acrylate in addition to the above acrylate. In this case, it is possible to improve the storage stability and the ejection stability of the ultraviolet ray curable ink jet composition, and to make the reactivity (curing property) of the ultraviolet ray curable ink jet composition ejected by the ink jet method especially excellent. This makes it possible to further improve the productivity of the printed object and the wear resistance and the like of the printed portion to be formed.

Furthermore, it is preferred that the ultraviolet ray curable ink jet composition contains the dimethylol tricyclodecane diacrylate and/or the amino acrylate as the polymerizable compound. This makes it possible to further improve the storage stability and the ejection stability of the ultraviolet ray curable ink jet composition and the wear resistance and the like of the printed portion to be formed.

Moreover, the ultraviolet ray curable ink jet composition may contain an oligomer as the polymerizable compound in addition to the monomer. It is especially preferred that the ultraviolet ray curable ink jet composition contains a polyfunctional oligomer. This makes it possible to especially improve the storage stability and the ejection stability of the ultraviolet ray curable ink jet composition and the wear resistance and the like of the printed portion to be formed.

In this regard, it is to be noted that, in the present invention, a polymerizable compound having a molecular skeleton including repeating units and a molecular weight of 600 or more is referred to as "oligomer". As the oligomer, an urethane oligomer in which the repeating units are urethane units or an epoxy oligomer in which the repeating units are epoxy units can be preferably used.

An amount of the polymerizable compound contained in the ultraviolet ray curable ink jet composition is preferably 50 mass % or more, and more preferably in the range of 60 to 90 mass %. This makes it possible to especially improve the wear resistance and the like of the printed portion to be formed using the ultraviolet ray curable ink jet composition.

Further, according to the present invention, even if the amount of the polymerizable compound is relatively high in such a way, it is possible to keep the sufficiently high stability (storage stability) of the ultraviolet ray curable ink jet composition. This makes it possible to reliably prevent the occurrence of the problems such as the increasing of the viscosity of the ultraviolet ray curable ink jet composition due to gelatinization thereof and the lowering of the ejection stability thereof resulting from the above increasing of the viscosity. Namely, in the case where the amount of the polymerizable compound is relatively high as described above, the effects of the present invention can be more remarkably exhibited.

Substance A

The substance A has the partial structure represented by the above formula (1). In the case where the ultraviolet ray curable ink jet composition contains the substance A having such a structure together with the metal particles subjected to the surface treatment, it is possible to make the storage stability and the curing property of the ultraviolet ray curable ink jet composition excellent. Further, in the printed object to be produced using the ultraviolet ray curable ink jet composition, it is possible to exhibit the gloss and the high-grade sense which the metal material itself constituting the metal particles inherently has. Furthermore, it is also possible to make the gloss and the wear resistance of the printed portion superior, to thereby improve the durability of the printed object.

In the above formula (1), $R^1$ may be a hydrogen atom, an oxygen radical, a hydrocarbon group or an alkoxy group in which a chain type or alicyclic type hydrocarbon group is bonded to an oxygen atom, but is especially preferably the hydrogen atom, a methyl group or an octyl oxy group. This makes it possible to especially improve the storage stability and the ejection stability of the ultraviolet ray curable ink jet composition, and the gloss and the wear resistance of the printed portion to be formed using the ultraviolet ray curable ink jet composition.

Further, in the above formula (1), each of $R^2$, $R^3$, $R^4$ and $R^5$ may be independently a hydrogen atom or a hydrocarbon group, but is preferably an alkyl group having carbon atoms of 1 to 3, and more preferably a methyl group. This makes it possible to especially improve the storage stability and the ejection stability of the ultraviolet ray curable ink jet composition, and the gloss and the wear resistance of the printed portion to be formed using the ultraviolet ray curable ink jet composition.

An amount of the substance A contained in the ultraviolet ray curable ink jet composition is preferably in the range of 0.1 to 5 mass %, and more preferably in the range of 0.5 to 3.0 mass %. This makes it possible to especially improve the storage stability, the ejection stability and the curing property of the ultraviolet ray curable ink jet composition, and the gloss, the wear resistance and the like of the printed object to be produced using the ultraviolet ray curable ink jet composition.

In this regard, it is to be noted that the ultraviolet ray curable ink jet composition may contain two or more kinds of compounds as the substance A. In this case, it is preferred that a total amount of these compounds is set to a value falling within the above range.

In the case where the amount of the substance A contained in the ultraviolet ray curable ink jet composition is defined as $X_A$ [mass %] and the amount of the metal particles contained therein is defined as $X_M$ [mass %], $X_A$ and $X_M$ satisfy preferably a relationship of $0.01 \leq X_A/X_M \leq 0.8$, and more preferably a relationship of $0.05 \leq X_A/X_M \leq 0.4$. By satisfying such a relationship, it is possible to especially improve the storage stability and the ejection stability of the ultraviolet ray curable ink jet composition, and to make the gloss and the wear resistance of the printed portion to be formed using the ultraviolet ray curable ink jet composition especially excellent.

Other Components

The ultraviolet ray curable ink jet composition of the present invention may contain components other than the above mentioned components (that is, other components). Examples of such other components include a photo initiator, a slipping agent (leveling agent), a dispersing agent, a polymerization accelerator, a penetration accelerator, a wetting agent (moisturizing agent), a coloring agent, a fixing agent, an antifungal agent, an antiseptic agent, an antioxidant, a chelating agent, a thickening agent, a sensitizing agent (sensitizing dye) and the like.

The photo initiator is not limited to a specific type, as long as it can generate radicals, cations and the like by being irradiated with an ultraviolet ray, and thus can start polymerization reaction of the polymerizable compound. As the photo initiator, a photo radical initiator or a photo cation initiator can be used, but the photo radical initiator can be preferably used. In the case where the photo initiator is used, it is preferred that the photo initiator has an absorption peak within an ultraviolet region.

Examples of the photo radical initiator include aromatic ketones, an acyl phosphine oxide compound, an aromatic onium salt compound, an organic peroxide, a thiocompound (e.g., a thioxanthone compound, a thiophenyl group containing compound), a hexaaryl biimidazole compound, a ketooxime ester compound, a borate compound, an azinium compound, a metallocene compound, an activated ester compound, a compound including a carbon-halogen bond, an alkyl amine compound and the like.

From the viewpoint of solubility with respect to the polymerizable compound and a curing property thereof, among them, at least one selected from the group consisting of the acyl phosphine oxide compound and the thioxanthone compound is preferable, and a combination of the acyl phosphine oxide compound and the thioxanthone compound is more preferable.

Concrete examples of the photo radical initiator include acetophenone, acetophenone benzyl ketal, 1-hydroxy cyclohexyl phenyl ketone, 2,2-dimethoxy-2-phenyl acetophenone, xanthone, fluorenone, benzaldehyde, fluorene, anthraquinone, triphenylamine, carbazole, 3-methyl acetophenone, 4-chloro benzophenone, 4,4'-dimethoxy benzophenone, 4,4'-diamino benzophenone, Michler's ketone, benzoin propyl ether, benzoin ethyl ether, benzyl dimethyl ketal, 1-(4-isopropyl phenyl)-2-hydroxy-2-methylpropane-1-on, 2-hydroxy-2-methyl-1-phenyl propane-1-on, thioxanthone, diethyl thioxanthone, 2-isopropyl thioxanthone, 2-chloro thioxanthone, 2-methyl-1-[4-(methyl thio) phenyl]-2-morpholino-propane-1-on, bis(2,4,6-trimethyl benzoyl)-phenyl phosphineoxide, 2,4,6-trimethyl benzoyl-diphenyl phosphineoxide, 2,4-diethyl thioxanthone, bis(2,6-dimethoxy benzoyl)-2,4,4-trimethyl pentyl phosphineoxide, and the like, and one of them can be used alone or two or more of them can be used in combination.

An amount of the photo initiator contained in the ultraviolet ray curable ink jet composition is preferably in the range of 0.5 to 10 mass %. If the amount of the photo initiator falls within the above range, a curing rate of the ultraviolet ray curable ink jet composition by the ultraviolet ray irradiation becomes sufficiently high, and an insoluble matter of the photo initiator or colouring resulting from the photo initiator is hardly generated.

In the case where the ultraviolet ray curable ink jet composition contains the slipping agent, a surface of the printed object becomes smooth due to a leveling effect thereof. This makes it improve the wear resistance of the printed object.

The slipping agent is not limited to a specific kind. As the slipping agent, a silicone-based surface active agent such as a polyester-modified silicone or a polyether-modified silicone can be used, and polyether-modified polydimethyl siloxane or polyester-modified polydimethyl siloxane can be preferably used.

In the case where the ultraviolet ray curable ink jet composition contains the dispersing agent, it is possible to make dispersiveness of the metal particles superior. This makes it possible to especially improve the storage stability and the ejection stability of the ultraviolet ray curable ink jet composition.

Examples of the dispersing agent include, but are not limited to, a polyoxy alkylene polyalkylene polyamine, a vinyl-type polymer and copolymer, an acryl-type polymer and copolymer, a polyester, a polyamide, a polyimide, a polyurethane, an amino-type polymer, a silicon-containing polymer, a sulfur-containing polymer, a fluorine-containing polymer, an epoxy resin, and the like.

The ultraviolet ray curable ink jet composition may contain a polymerization inhibitor. However, even if the ultraviolet ray curable ink jet composition contains the polymerization inhibitor, an amount of the polymerization inhibitor contained therein is preferably 0.6 mass % or less, and more preferably 0.2 mass % or less. This makes it possible to adjust the amount of the polymerizable compound contained in the ultraviolet ray curable ink jet composition to a relatively high value.

Therefore, it is possible to especially improve the wear resistance and the like of the printed portion to be formed using the ultraviolet ray curable ink jet composition. Further, in the present invention, even in the case where the amount of the polymerization inhibitor is relatively lower in such a way, it is possible to make the storage stability and the ejection stability of the ultraviolet ray curable ink jet composition sufficiently excellent.

Further, it is preferred that the ultraviolet ray curable ink jet composition does not contain an organic solvent which would be removed (vapored) during steps of producing the printed object. This makes it possible to effectively prevent a problem resulted from a volatile organic compound (VOC) from being generated.

A viscosity at room temperature (20° C.) of the ultraviolet ray curable ink jet composition is preferably 20 mPa·s or less, and more preferably in the range of 3 to 15 mPa·s. This makes it possible to appropriately eject the ultraviolet ray curable ink jet composition using the ink jet method.

Printed Object (Recorded Object)

Next, a printed object of the present invention will be described.

The printed object of the present invention is produced by applying the above mentioned ultraviolet ray curable ink jet composition onto an object (recording medium), and then irradiating the ultraviolet ray curable ink jet composition with an ultraviolet ray. Such a printed object is provided with a printed portion having high gloss and wear resistance, and has good durability.

As described above, the ultraviolet ray curable ink jet composition according to the present invention contains the polymerizable compound, and thus exhibits excellent adhesion with respect to the object. Therefore, since the ultraviolet ray curable ink jet composition exhibits the excellent adhesion with respect to the object, the object may be any types. As the object, an absorbent medium or an unabsorbent medium may be used. For example, a paper (e.g., a plain paper, a special paper for ink jet), a plastic material, a metal, a ceramics, a timber, a shell, a natural or synthetic fiber such as cotton, polyester or wool, a non-woven fabric or the like can be used.

The printed object of the present invention may be used in any applications, for example, may be used in trinkets or articles other than the trinkets. Concrete examples of the printed object of the present invention include: vehicular interior trims such as a console lid, a switch base, a center cluster, an interior panel, an emblem, a center console and meter nameplate; operating portions of various kinds of electronic devices (keyswitchs); trims exhibiting decorativeness; presentments such as an index and a logo; and the like.

As a system for ejecting liquid droplets (that is, a system of the ink jet method), a piezo system, a system for ejecting an ink by bubbles which are generated by heating the ink, or the like can be used. However, the piezo system is preferable, for the reason that the ultraviolet ray curable ink jet composition is difficult to be deteriorated, and the other reasons.

The ejection of the ultraviolet ray curable ink jet composition by the ink jet method can be carried out using a well-known liquid droplet ejection device.

The ultraviolet ray curable ink jet composition ejected by the ink jet method is cured by being irradiated with an ultraviolet ray.

As an ultraviolet ray irradiation source, for example, a mercury lamp, a metal halide lamp, an ultraviolet ray light emitting diode (UV-LED), an ultraviolet ray laser diode (UV-LD) or the like can be used. Among them, the ultraviolet ray light emitting diode (UV-LED) or the ultraviolet ray laser diode (UV-LD) is preferable, for the reason that such a source has a small size, a long life time, high efficiency and a low cost.

While the present invention has been described hereinabove based on the preferred embodiments, the present invention is not limited thereto.

EXAMPLES

Next, description will be made on concrete examples of the present invention.

1: Preparation of Ink Jet Composition (Ultraviolet Ray Curable Ink Jet Composition)

Example 1

First, prepared was a film having a flat surface and made of polyethylene terephthalate (surface roughness Ra: 0.02 μm or less).

Next, silicone oil was applied onto the entirety of one surface of the film.

Next, a coat made of Al was formed onto a surface of the film on which the silicone oil was applied using an evaporation method.

The film (base) made of polyethylene terephthalate, on which the Al coat was formed, was dipped into a liquid constituting from diethylene glycol diethyl ether, and then ultrasonic vibration was applied thereto. In this way, obtained were scaly particles (that is, particles to be used as base particles) each made of Al.

Next, the particles each made of Al and obtained as described above were dipped into a phenoxy ethyl acrylate solution containing $CF_3(CF_2)_5$—$CH_2CH_2$—$Si(OC_2H_5)_3$ which was a fluorine type silane compound in an amount of 1 mass %, and then stirred for 10 seconds. In this way, the particles were subjected to a surface treatment with the fluorine type silane compound, to thereby obtain a metal dispersion liquid.

An average particle size of the metal particles contained in the metal dispersion liquid obtained in this way was 0.7 μm and an average thickness thereof was 35 nm.

Next, a substance A having a chemical structure represented by the following formula (7), phenoxy ethyl acrylate, 2-(2-vinyloxy ethoxy)ethyl acrylate, tripropylene glycol diacrylate, dipropylene glycol diacrylate, 4-hydroxy butyl acrylate, Irgacure 819 (produced by Ciba Japan k. k.) as a photo initiator, Speedcure TPO (produced by Lambson) as a photo initiator, Speedcure DETX (produced by Lambson) as a photo initiator, UV-3500 (produced by BYK) as a leveling agent and hydroquinone monomethyl ether as a polymerization inhibitor were mixed with the metal dispersion liquid. In this way, obtained was an ink jet composition (ultraviolet ray curable ink jet composition).

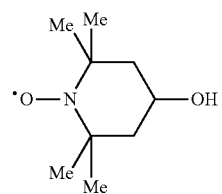

(7)

Examples 2 to 10

An ink jet composition (ultraviolet ray curable ink jet composition) was prepared in the same manner as Example 1 except that a constitution thereof became as shown in Table 1 by changing the construction of each metal particle (composition of each base particle and the kinds of the compound used from the surface treatment) as shown in Table 1 and changing the kinds and ratio of the raw materials (e.g., substance A) for preparing the ink jet composition (ultraviolet ray curable ink jet composition).

Comparative Example 1

An ink jet composition (ultraviolet ray curable ink jet composition) was prepared in the same manner as Example 1 except that particles each made of Al and not subjected to the surface treatment were used as the metal particles.

Comparative Example 2

An ink jet composition (ultraviolet ray curable ink jet composition) was prepared in the same manner as Comparative Example 1 except that a constitution thereof became as shown in Table 2 by changing the mixing ratio of the raw materials for preparing the ink jet composition (ultraviolet ray curable ink jet composition).

Comparative Example 3

An ink jet composition (ultraviolet ray curable ink jet composition) was prepared in the same manner as Comparative Example 1 except that spherical metal particles each made of Al and produced using an atomizing method (not subjected to the surface treatment) were used as the metal particles.

Comparative Example 4

An ink jet composition (ultraviolet ray curable ink jet composition) was prepared in the same manner as Comparative Example 3 except that a constitution thereof became as shown in Table 2 by changing the mixing ratio of the raw materials for preparing the ink jet composition (ultraviolet ray curable ink jet composition).

Comparative Example 5

An ink jet composition (ultraviolet ray curable ink jet composition) was prepared in the same manner as Example 1 except that a constitution containing no substance A as shown in Table 2 was adjusted by changing the mixing ratio of the raw materials for preparing the ink jet composition (ultraviolet ray curable ink jet composition).

Comparative Example 6

An ink jet composition (ultraviolet ray curable ink jet composition) was prepared in the same manner as Comparative Example 5 except that a constitution thereof became as shown in Table 2 by changing the mixing ratio of the raw materials for preparing the ink jet composition (ultraviolet ray curable ink jet composition).

Comparative Example 7

An ink jet composition (ultraviolet ray curable ink jet composition) was prepared in the same manner as Example 1 except that particles each made of Al and not subjected to the surface treatment were used as the metal particles and that a constitution containing no substance A as shown in Table 2 was adjusted by changing the mixing ratio of the raw materials for preparing the ink jet composition (ultraviolet ray curable ink jet composition).

Comparative Example 8

An ink jet composition (ultraviolet ray curable ink jet composition) was prepared in the same manner as Comparative Example 7 except that a constitution thereof became as shown in Table 2 by changing the mixing ratio of the raw materials for preparing the ink jet composition (ultraviolet ray curable ink jet composition).

Comparative Example 9

The scaly metal particles obtained in the same manner as Example 1, 1,2-hexanediol, trimethylol propane, surfynol 465 (produced by Nissin Chemical Industry CO., Ltd.), triethanolamine, glycerine, POLYFLOW 401 (produced by Nissin Chemical Industry CO., Ltd.) and an ion exchanged water were mixed with each other. In this way, an ink jet composition (ultraviolet ray curable ink jet composition) was prepared. Namely, the ink jet composition of this Comparative Example did not contain the polymerizable compound to be cured by the ultraviolet ray irradiation.

The constitutions of the ink jet compositions obtained in Examples and Comparative Examples are shown in Table 1 and Table 2.

In Tables, indicated are $CF_3(CF_2)_5$—$CH_2CH_2$—$Si(OC_2H_5)_3$ as "A1", $CF_3(CF_2)_5(CH_2)_2O$—$PO(OH)_2$ as "A2", $CH_3(CH_2)_{11}O$—$PO(OH)_2$ as "A3", $CH_3(CH_2)_{17}O$—$Si(OC_2H_5)_3$ as "A4", $CH_3(CH_2)_{17}O$—COOH as "A5", $CF_3(CF_2)_6$—COOH as "A6", the compound represented by the above formula (7) (that is, the substance A) as "A7", a compound represented by the following formula (8) (that is, the substance A) as "A8", a compound represented by the following formula (9) (that is, the substance A) as "A9", a compound represented by the following formula (10) (that is, the substance A) as "A10", phenoxy ethyl acrylate as "PEA", 2-(2-vinyloxy ethoxy)ethyl acrylate as "VEEA", tetrahydro furfuryl acrylate as "THFA", tripropylene glycol diacrylate as "TPGDA", dipropylene glycol diacrylate as "DPGDA", polypropylene glycol diacrylate as "PEDA", N-vinyl caprolactam as "NVC", benzyl methacrylate as "BM", dimethylol tricyclodecane diacrylate as "DMTCDDA", amino acrylate as "AA", urethane acrylate as "UA", hexanediol diacrylate as "HDA", cyclohexyl acrylate as "CHA", γ-butyrolactone acrylate as "GBLA", Irgacure 819 (produced by Ciba Japan k. k.) as "ic819", Speedcure TPO (produced by ACETO Coporation) as "scTPO", Speedcure DETX (produced by Lambson) as "scDETX", UV-3500 (produced by BYK) as "UV3500", hydroquinone monomethyl ether as "MEHQ", 4-hydroxy butyl acrylate as "HBA", 1,2-hexanediol as "1,2HD", trimethylol propane as "TMP", surfynol 465 (produced by Nissin Chemical Industry CO., Ltd.) as "S465", triethanolamine as "TEA", glycerine as "GL", and POLYFLOW 401 (produced by Nissin Chemical Industry CO., Ltd.) as "PF401".

Further, arbitrary 10 metal particles contained in each ink jet composition were observed. In each of the metal particles, an area of the metal particle observed from a direction, where a project area thereof peaked, (that is, an area of each metal particle at a planar view thereof) was defined as $S_1$ (μm²), an area of the metal particle observed from a direction that was orthogonal to the above observation direction, where an area thereof peaked, was defined as $S_0$ (μm²), and a ratio of $S_1$ to $S_0$ ($S_1/S_0$) was calculated. An average of the calculated values was also indicated in Table 1 and Table 2.

Furthermore, in Tables, a ratio of the respective atoms contained in the composition of the base particles obtained in each of Examples 9 and 10 is indicated as a ratio by weight. Moreover, a viscosity at 20° C. of the ink jet composition (ultraviolet ray curable ink jet composition) prepared in each of Examples, which was measured using an oscillating type viscometer based on JIS 28809, was a value falling within a range of 3 to 15 mPa·s. In addition, an amount of components other than the constituent components shown in Tables, which were contained in the base particles obtained in each of Examples and Comparative Examples, was 0.5 mass % or less.

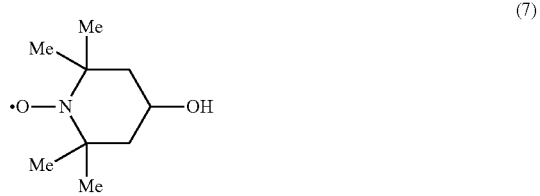

(7)

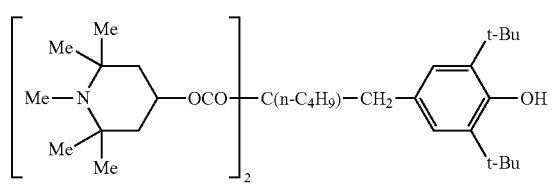

(8)

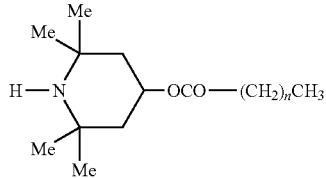

(10)

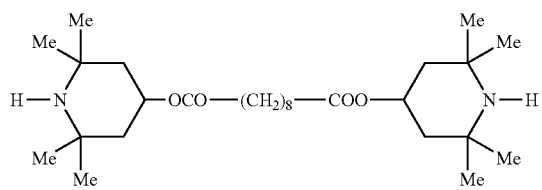

(9)

In this regard, the substance A represented by the formula (10) was a mixture of compounds each having n of 10 to 19 in the formula (containing a major compound having n of 15 to 18 in the formula).

TABLE 1

| | Metal particles | | | | | |
|---|---|---|---|---|---|---|
| | Constituent material of base particles | Material used for surface treatment | Shape | Average particle size [μm] | $S_1/S_0$ | Amount [parts by weight] | Polymerizable compound |
| Ex. 1 | A1 | A1 | Scaly | 0.7 | 50 | 2.0 | PEA/VEEA/TPGDA/DPGDA/HBA |
| Ex. 2 | A1 | A1 | Scaly | 0.9 | 39 | 4.0 | PEA/TPGDA/DPGDA/NVC/DMTCDDA/AA |
| Ex. 3 | A1 | A1 | Scaly | 1.0 | 51 | 2.0 | THFA/NVC/TPGDA/CHA/HDA |
| Ex. 4 | A1 | A2 | Scaly | 1.1 | 25 | 2.0 | VEEA/THFA/PEDA/DPGDA/GBLA |
| Ex. 5 | A1 | A3 | Scaly | 1.0 | 29 | 2.0 | VEEA/GBLA/TPGDA/DPGDA/BM/DMTCDDA/UA |
| Ex. 6 | A1 | A4 | Scaly | 0.4 | 37 | 4.0 | PEA/VEEA/PEDA |
| Ex. 7 | A1 | A5 | Scaly | 0.8 | 38 | 2.0 | VEEA/THFA/NVC |
| Ex. 8 | A1 | A6 | Scaly | 1.5 | 21 | 1.0 | VEEA/THFA/TPGDA/HDA/BM |
| Ex. 9 | A190.65 Mg2.54 Cu1.60 Zn5.19 Mn0.02 | A3 | Scaly | 1.8 | 19 | 2.0 | PEA/VEEA/TPGDA/DPGDA/AA |
| Ex. 10 | Ni49.5 Fe50.5 | A4 | Scaly | 1.5 | 22 | 2.0 | PEA/VEEA/TPGDA/DPGDA/BM |

| | Polymerizable compound | Substance A | | Other components | |
|---|---|---|---|---|---|
| | Amount [parts by weight] | Kind | Amount [parts by weight] | | Amount [parts by weight] |
| Ex. 1 | 36.0/39.8/2.0/5.5/4.0 | A7 | 0.3 | ic819/scTPO/scDETX/UV3500/MEHQ | 4.0/4.0/2.0/0.2/0.2 |
| Ex. 2 | 68.2/3.6/5.0/3.0/3.0/2.0 | A8 | 0.8 | ic819/scTPO/scDETX/UV3500/MEHQ | 4.0/4.0/2.0/0.2/0.2 |
| Ex. 3 | 32.45/25.0/10.95/10.0/8.0 | A7 | 1.4 | ic819/scTPO/scDETX/UV3500 | 4.0/4.0/2.0/0.2 |
| Ex. 4 | 47.7/26.0/5.5/5.5/5.5 | A7 | 0.4 | ic819/scTPO/scDETX/UV3500/MEHQ | 4.0/4.0/2.0/0.2/0.2 |
| Ex. 5 | 44.9/29.0/5.5/3.9/3.0/2.0/1.0 | A9 | 0.3 | ic819/scTPO/UV3500/MEHQ | 4.0/4.0/2.0/0.2 |
| Ex. 6 | 51.4/29.0/5.0 | A7 | 0.2 | ic819/scTPO/scDETX/UV3500/MEHQ | 4.0/4.0/2.0/0.2/0.2 |
| Ex. 7 | 53.8/27.6/5.0 | A10 | 1.2 | ic819/scTPO/scDETX/UV3500/MEHQ | 4.0/4.0/2.0/0.2/0.2 |

TABLE 1-continued

| | | | | | | |
|---|---|---|---|---|---|---|
| Ex. 8 | 47.1/28.0/5.0/5.0/2.5 | | A7 | 1.0 | ic819/scTPO/scDETX/UV3500/MEHQ | 4.0/4.0/2.0/0.2/0.2 |
| Ex. 9 | 53.0/20.2/5.0/5.5/3.5 | | A7 | 0.4 | ic819/scTPO/scDETX/UV3500/MEHQ | 4.0/4.0/2.0/0.2/0.2 |
| Ex. 10 | 47.62/29.0/5.5/3.5/1.8 | | A7 | 0.4 | ic819/scTPO/scDETX/UV3500 | 4.0/4.0/2.0/0.2 |

TABLE 2

| | Metal particles | | | | | Polymerizable compound | | Substance A | | Other components | |
|---|---|---|---|---|---|---|---|---|---|---|---|
| | Constituent material of base particles | Material used for surface treatment | Shape | Average particle size [μm] | $S_1/S_0$ | Amount [parts by weight] | | Amount [parts by weight] | Kind | Amount [parts by weight] | Amount [parts by weight] |
| Com. Ex. 1 | A1 | — | Scaly | 0.7 | 50 | 2.0 | PEA/VEEA/TPGDA/DPGDA/HBA | 36.0/39.8/2.0/5.5/4.0 | A7 | 0.3 | ic819/scTPO/scDETX/UV3500/MEHQ | 4.0/4.0/2.0/0.2/0.2 |
| Com. Ex. 2 | A1 | — | Scaly | 0.7 | 50 | 2.0 | PEA/VEEA/TPGDA/DPGDA/HBA | 33.2/39.6/2.0/5.5/4.0 | A7 | 0.3 | ic819/scTPO/scDETX/UV3500/MEHQ | 4.0/4.0/2.0/0.2/3.2 |
| Com. Ex. 3 | A1 | — | spherical | 0.8 | 1 | 2.0 | PEA/VEEA/TPGDA/DPGDA/HBA | 36.0/39.8/2.0/5.5/4.0 | A7 | 0.3 | ic819/scTPO/scDETX/UV3500/MEHQ | 4.0/4.0/2.0/0.2/0.2 |
| Com. Ex. 4 | A1 | — | spherical | 0.8 | 1 | 2.0 | PEA/VEEA/TPGDA/DPGDA/HBA | 33.2/39.6/2.0/5.5/4.0 | A7 | 0.3 | ic819/scTPO/scDETX/UV3500/MEHQ | 4.0/4.0/2.0/0.2/3.2 |
| Com. Ex. 5 | A1 | A1 | Scaly | 0.7 | 50 | 2.0 | PEA/VEEA/TPGDA/DPGDA/HBA | 36.5/39.6/2.0/5.5/4.0 | — | — | ic819/scTPO/scDETX/UV3500/MEHQ | 4.0/4.0/2.0/0.2/0.2 |
| Com. Ex. 6 | A1 | A1 | Scaly | 0.7 | 50 | 2.0 | PEA/VEEA/TPGDA/DPGDA/HBA | 33.5/39.6/2.0/5.5/4.0 | — | — | ic819/scTPO/scDETX/UV3500/MEHQ | 4.0/4.0/2.0/0.2/3.2 |
| Com. Ex. 7 | A1 | — | Scaly | 0.7 | 50 | 2.0 | PEA/VEEA/TPGDA/DPGDA/HBA | 36.5/39.6/2.0/5.5/4.0 | — | — | ic819/scTPO/scDETX/UV3500/MEHQ | 4.0/4.0/2.0/0.2/0.2 |
| Com. Ex. 8 | A1 | — | Scaly | 0.7 | 50 | 2.0 | PEA/VEEA/TPGDA/DPGDA/HBA | 33.5/39.6/2.0/5.5/4.0 | — | — | ic819/scTPO/scDETX/UV3500/MEHQ | 4.0/4.0/2.0/0.2/3.2 |
| Com. Ex. 9 | A1 | A1 | Scaly | 0.7 | 50 | 3.0 | — | — | A7 | 0.3 | water/1,2HD/TMP/S465/TEA/GL/PF401 | 68.8/3.0/14.0/1.5/0.3/9.0/0.1 |

The ink jet composition prepared in each of Examples and Comparative Examples was evaluated by tests described below.

2: Evaluation of Stability of Liquid Droplet Ejection (Ejection Stability Evaluation)

First, a liquid droplet ejection device provided inside a chamber (thermal chamber) and the ink jet composition obtained in each of Examples and Comparative Examples were prepared. Driving waveforms of piezo elements were optimized, and then 2,000,000 liquid droplets of the ink jet composition were continuously ejected from the respective nozzles of a liquid droplet ejection head under the environment of 25° C. and 55% RH. Thereafter, operation of the liquid droplet ejection device was stopped, and then it was left under the environment of 25° C. and 55% RH for 240 hours in a state that the ink jet composition was filled into flow passes of the liquid droplet ejection device.

Next, 3,000,000 liquid droplets of the ink jet composition were continuously ejected from the respective nozzles of the ink jet head under the environment of 25° C. and 55% RH. On each of 3,000,000 liquid droplets ejected from the specified nozzles located at a central portion of the liquid droplet ejection head after a lapse of 240 hours, a shift length "d" between a center point of the spotted (landed) droplet and an objective point thereof to be spotted was measured. An average value of the shift lengths "d" was calculated.

Based on the calculated average value, the stability of liquid droplet ejection was evaluated according to the following criteria including 5 grades. In this regard, it is to be noted that a smaller average value means that change of an ejecting direction of each liquid droplet is effectively prevented.

A: The average value of the shift lengths "d" is less than 0.09 μm.

B: The average value of the shift lengths "d" is 0.09 μm or more, but less than 0.15 μm.

C: The average value of the shift lengths "d" is 0.15 μm or more, but less than 0.18 μm.

D: The average value of the shift lengths "d" is 0.18 μm or more, but less than 0.22 μm.

E: The average value of the shift lengths "d" is 0.22 μm or more.

3: Evaluation of Storage Stability of Ink Jet Composition (Long-Term Stability Evaluation)

The ink jet composition prepared in each of Examples and Comparative Examples was left under the environment of 40° C. for days. Thereafter, the viscosity at 20° C. of the ink jet composition was measured using an oscillating type viscometer based on JIS 28809, and then an increasing ratio with respect to the viscosity of the ink jet composition just prepared was calculated. Based on the increasing ratio of the viscosity, the storage stability was evaluated according to the following criteria including 5 grades.

A: The increasing ratio of the viscosity is less than 5%.
B: The increasing ratio of the viscosity is 5% or more, but less than 10%.
C: The increasing ratio of the viscosity is 10% or more, but less than 20%.
D: The increasing ratio of the viscosity is 20% or more, but less than 25%.
E: The increasing ratio of the viscosity is 25% or more, or generation of foreign materials is observed.

4: Curing Property

The ink jet composition prepared in each of Examples and Comparative Examples was loaded to an ink jet printer ("PM800C" produced by Seiko Epson Corporation), solid printing of the ink jet composition onto an object having a thickness of 38 µm ("DIAFOIL G440E" produced by Mitsubishi Plastics Inc.) was carried out in an ink amount of wet 9 g/m$^2$, and then the ink jet composition was immediately irradiated with an ultraviolet ray (gap: 6 mm, peak wavelength: 365 nm, 1000 mW/cm$^2$) using a LED-UV lump ("RX firefly" produced by Phoseon Technology). Thereafter, it was confirmed whether or not the ink jet composition was cured.

Based on the confirmation result, the curing property was evaluated according to the following criteria including 5 grades. The curing or non-curing of the ink jet composition was judged by rubbing a surface of the ink jet composition with a swab and observing whether or not a non-cured matter of the ink jet composition adhered to the swab. In this regard, it is to be noted that an ultraviolet ray irradiation amount can be calculated by the number of seconds when the LED-UV lump was lighted.

A: The ink jet composition was cured by the ultraviolet ray irradiation amount of 100 mJ/cm$^2$ or less.
B: The ink jet composition was cured by the ultraviolet ray irradiation amount of 100 mJ/cm$^2$ or more, but less than 200 mJ/cm$^2$.
C: The ink jet composition was cured by the ultraviolet ray irradiation amount of 200 mJ/cm$^2$ or more, but less than 500 mJ/cm$^2$.
D: The ink jet composition was cured by the ultraviolet ray irradiation amount of 500 mJ/cm$^2$ or more, but less than 1,000 mJ/cm$^2$.
E: The ink jet composition was cured by the ultraviolet ray irradiation amount of 1,000 mJ/cm$^2$ or more, or was never cured.

5: Production of Printed Object

An interior panel as a printed object was produced using the ink jet composition prepared in each of Examples and Comparative Examples as follows.

First, the ink jet composition was loaded to an ink jet device.

Next, on a base material having a curved surface portion, which was formed using a polycarbonate sheet with a thickness of 2 mm ("CARBOGLASS polish" produced by ASAHI GLASS CO., LTD.) (that is, an object), the ink jet composition was ejected in a predetermined pattern.

Thereafter, the ink jet composition was irradiated with an ultraviolet ray having a spectrum with maximum values at wavelengths of 365 nm, 380 nm and 395 nm and an radiation intensity of 180 mW/cm$^2$ for 20 seconds, and thus was cured. In this way, the interior panel was produced as the printed object.

In each of Examples and Comparative Examples, 10 interior panels (printed objects) were produced using the ink jet composition according to the above mentioned method.

Further, 10 interior panels (printed objects) were produced using the ink jet composition prepared in each of Examples and Comparative Examples in the same method as described above, except that a base material formed using a polyethylene terephthalate sheet with a thickness of 38 µm ("DIAFOIL G440E" produced by Mitsubishi Plastics Inc.), a base material formed using a low density polyethylene sheet ("T.U.X (L-LDPE) HC-E #80" produced by Mitsui Chemicals Tohcello Inc.), a base material formed using a biaxial stretching polypropylene sheet ("OP U-1 #60" produced by Mitsui Chemicals Tohcello Inc.), or a base material formed using a hard vinyl chloride sheet having a thickness of 0.5 mm ("SUNDAY SHEET (transparent)" produced by ACRYSUNDAY Co., Ltd.) was used.

6: Evaluation of Printed Object

Each of the printed objects produced in the above mentioned way was evaluated as follows.

6.1: Evaluation of Appearance of Printed Object

The printed objects produced using the ink jet composition prepared in each of Examples and Comparative Examples were visually observed, and appearance of each of the printed objects was evaluated according to the following criteria including 7 grades.

A: The printed object exhibits gloss with very high-grade sense, and has extra excellent appearance.
B: The printed object exhibits gloss with very high-grade sense, and has very excellent appearance.
C: The printed object exhibits gloss with high-grade sense, and has excellent appearance.
D: The printed object exhibits gloss with high-grade sense, and has appropriate appearance.
E: The printed object exhibits inferior gloss, and has slightly poor appearance.
F: The printed object exhibits inferior gloss, and has poor appearance.
G: The printed object exhibits inferior gloss, and has extra poor appearance.

6.2: Glossiness

Glossiness of pattern formation portions of the printed objects produced using the ink jet composition prepared in each of Examples and Comparative Examples was measured at a measurement angle of 60° using a gloss meter ("MINOLTA MULTI GLOSS 268"), and the glossiness was evaluated according to the following criteria including 4 grades.

A: The glossiness is 300 or more.
B: The glossiness is 200 or more, but less than 300.
C: The glossiness is 100 or more, but less than 200.
D: The glossiness is but less than 100.

6.3: Wear Resistance

At 48 hours having passed since the production of the printed objects produced using the ink jet composition prepared in each of Examples and Comparative Examples, the printed objects were subjected to a wear resistance test using a Sutherland Rub Tester based on JIS K5701. Thereafter, on the printed objects after the wear resistance test, glossiness thereof was also measured at a measurement angle of 60° in the same manner as described in the above "6.2".

A decreasing ratio of the glossiness before and after the wear resistance test was calculated, and then wear resistance was evaluated according to the following criteria including 5 grades.

A: The decreasing ratio of the glossiness is less than 6%.
B: The decreasing ratio of the glossiness is 6% or more, but less than 14%.
C: The decreasing ratio of the glossiness is 14% or more, but less than 24%.

D: The decreasing ratio of the glossiness is 24% or more, but less than 28%.

E: The decreasing ratio of the glossiness is 28% or more.

These results are indicated in Table 3. In this regard, it is to be noted that indicated are the printed object formed using the base material made of polycarbonate as "M1", the printed object formed using the base material made of polyethylene terephthalate as "M2", the printed object formed using the base material made of low density polyethylene as "M3", the printed object formed using the base material made of biaxial stretching polypropylene as "M4", and the printed object formed using the base material made of hard vinyl chloride as "M5".

TABLE 3

|  | Ejection stability | Long-term stability | Curing property | Appearance of printed object | | | | | Glossiness | | | | | Wear resistance | | | | |
|---|---|---|---|---|---|---|---|---|---|---|---|---|---|---|---|---|---|---|
|  |  |  |  | M1 | M2 | M3 | M4 | M5 | M1 | M2 | M3 | M4 | M5 | M1 | M2 | M3 | M4 | M5 |
| Ex. 1 | A | A | A | A | A | A | A | A | A | A | A | A | A | A | A | A | A | A |
| Ex. 2 | A | B | A | A | A | A | A | A | A | A | A | A | A | A | A | A | A | A |
| Ex. 3 | A | B | A | A | A | A | A | A | A | A | A | A | A | A | A | A | A | A |
| Ex. 4 | A | A | A | A | A | A | A | A | A | A | A | A | A | A | A | A | A | A |
| Ex. 5 | B | A | A | A | A | A | A | A | A | A | A | A | A | A | A | A | A | A |
| Ex. 6 | A | A | A | A | A | A | A | A | A | A | A | A | A | A | A | A | A | A |
| Ex. 7 | B | B | A | A | A | A | A | A | B | B | B | B | B | A | A | A | A | A |
| Ex. 8 | B | B | B | A | A | A | A | A | A | A | A | A | A | B | B | B | B | B |
| Ex. 9 | B | B | A | A | A | A | A | A | A | A | A | A | A | B | B | B | B | B |
| Ex. 10 | A | A | A | A | A | A | A | A | A | A | A | A | A | A | A | A | A | A |
| Com. Ex. 1 | E | E | A | F | F | F | F | F | C | C | C | C | C | C | C | C | C | C |
| Com. Ex. 2 | C | C | E | E | E | E | E | E | C | C | C | C | C | E | E | E | E | E |
| Com. Ex. 3 | D | D | A | G | G | G | G | G | D | D | D | D | D | C | C | C | C | C |
| Com. Ex. 4 | C | C | E | G | G | G | G | G | D | D | D | D | D | E | E | E | E | E |
| Com. Ex. 5 | D | D | A | F | F | F | F | F | C | C | C | C | C | C | C | C | C | C |
| Com. Ex. 6 | C | C | E | E | E | E | E | E | C | C | C | C | C | E | E | E | E | E |
| Com. Ex. 7 | E | E | A | G | G | G | G | G | D | D | D | D | D | C | C | C | C | C |
| Com. Ex. 8 | D | D | E | F | F | F | F | F | C | C | C | C | C | E | E | E | E | E |
| Com. Ex. 9 | C | C | — | C | C | C | C | C | C | C | C | C | C | E | E | E | E | E |

As shown in Table 3, the ultraviolet ray curable ink jet composition of the present invention is excellent in the liquid droplet ejection stability, the storage stability and the curing property. Further, the printed object of the present invention exhibits superior gloss and has excellent appearance, and the pattern formation portion also has high wear resistance. On the other hand, sufficient results are not obtained in Comparative Examples.

What is claimed is:

1. An ultraviolet ray curable ink jet composition adapted to be ejected using an ink jet method, comprising:

a polymerizable compound;

metal particles subjected to a surface treatment using a fluorine type phosphoric acid ester; and a substance A having a partial structure represented by the following formula (1),

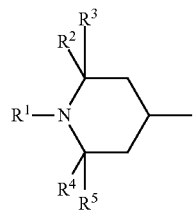

where $R^1$ is a hydrogen atom, an oxygen radical, a hydrocarbon group or an alkoxy group, and each of $R^2$, $R^3$, $R^4$ and $R^5$ is independently a hydrogen atom or a hydrocarbon group.

2. The ultraviolet ray curable ink jet composition as claimed in claim 1, wherein the surface treatment for the metal particles is carried out using a compound having an alkyl group including carbon atoms of 8 to 20.

3. The ultraviolet ray curable ink jet composition as claimed in claim 1, wherein the surface treatment for the metal particles is carried out using a compound having no aromatic ring.

4. The ultraviolet ray curable ink jet composition as claimed in claim 1, wherein at least a surface of each metal particle is formed from Al.

5. The ultraviolet ray curable ink jet composition as claimed in claim 1, wherein each metal particle is of a scaly shape.

6. The ultraviolet ray curable ink jet composition as claimed in claim 1, wherein an average particle size of the metal particles is in the range of 400 nm to 3.0 μm.

7. The ultraviolet ray curable ink jet composition as claimed in claim 1, wherein in the case where an amount of the substance A contained in the ultraviolet ray curable ink jet composition is defined as $X_A$ [mass %] and an amount of the metal particles contained therein is defined as $X_M$ [mass %], $X_A$ and $X_M$ satisfy a relationship of $0.01 \leq X_A/X_M \leq 0.8$.

8. The ultraviolet ray curable ink jet composition as claimed in claim 1, wherein the ultraviolet ray curable ink jet composition further comprises a polymerization inhibitor, and an amount of the polymerization inhibitor contained in the ultraviolet ray curable ink jet composition is 0.6 mass % or less.

9. The ultraviolet ray curable ink jet composition as claimed in claim 1, wherein an amount of the polymerizable compound contained in the ultraviolet ray curable ink jet composition is 50 mass % or more.

10. The ultraviolet ray curable ink jet composition as claimed in claim 1, wherein the polymerizable compound contains at least one selected from the group consisting of phenoxy ethyl acrylate, 2-(2-vinyloxy ethoxy) ethyl acrylate and tetrahydro furfuryl acrylate.

11. The ultraviolet ray curable ink jet composition as claimed in claim 10, wherein the polymerizable compound contains at least one selected from the group consisting of dipropylene glycol diacrylate, tripropylene glycol diacrylate, polypropylene glycol diacrylate, hexanediol diacrylate, cyclohexyl acrylate, γ-butyrolactone acrylate, N-vinyl caprolactam and 4-hydroxy butyl acrylate in addition to the acrylate.

12. The ultraviolet ray curable ink jet composition as claimed in claim 1, wherein the polymerizable compound contains dimethylol tricyclodecane diacrylate and/or amino acrylate.

13. The ultraviolet ray curable ink jet composition as claimed in claim 1, wherein each of $R^2$, $R^3$, $R^4$ and $R^5$ is the hydrocarbon group.

14. The ultraviolet ray curable ink jet composition as claimed in claim 1, wherein a hydroxyl group or a carbonyl group is bonded to a 4-position of the piperidine ring of the substance A.

15. The ultraviolet ray curable ink jet composition as claimed in claim 1, wherein the fluorine type phosphoric acid ester is a compound having a chemical structure represented by $POR_n(OH)_{3-n}$ (where R is $CF_3$ $(CF_2)_m$—, $CF_3(CF_2)_m(CH_2)_l$—, $CF_3$ $(CF_2)_m(CH_2O)_l$—, $CF_3(CF_2)_m(CH_2CH_2O)_l$—, $CF_3(CF_2)_mO$— or $CF_3(CF_2)_m(CH_2)_lO$—, n is an integral number of 1 to 3, m is an integral number of 2 to 18, and l is an integral number of 1 to 18).

16. A printed object produced by applying the ultraviolet ray curable ink jet composition defined by claim 1 onto an object, and then irradiating the ultraviolet ray curable ink jet composition with an ultraviolet ray.

* * * * *